United States Patent
Miyauchi et al.

(10) Patent No.: US 12,542,467 B2
(45) Date of Patent: Feb. 3, 2026

(54) MOTOR BEARING SYSTEM

(71) Applicant: Mazda Motor Corporation, Hiroshima (JP)

(72) Inventors: Yuma Miyauchi, Aki-gun (JP); Runa Suzuki, Aki-gun (JP); Masayuki Kidokoro, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 201 days.

(21) Appl. No.: 18/613,519

(22) Filed: Mar. 22, 2024

(65) Prior Publication Data
US 2024/0322635 A1      Sep. 26, 2024

(30) Foreign Application Priority Data

Mar. 23, 2023   (JP) .................. 2023-046468

(51) Int. Cl.
| | | |
|---|---|---|
| H02K 5/16 | (2006.01) | |
| F16C 21/00 | (2006.01) | |
| F16C 33/10 | (2006.01) | |

(52) U.S. Cl.
CPC ............ H02K 5/161 (2013.01); F16C 21/00 (2013.01); F16C 33/1005 (2013.01)

(58) Field of Classification Search
CPC ...... H02K 5/161; H02K 7/083; H02K 5/1672; H02K 5/1732; H02K 11/21; H02K 11/30; F16C 21/00; F16C 33/1005; F16C 2233/00; F16C 2360/00; F16C 19/163; F16C 19/52; F16C 19/547; F16C 32/0614; F16C 19/06; F04D 29/059; B60K 1/00; F04B 49/02; F04B 49/06
See application file for complete search history.

(56) References Cited

U.S. PATENT DOCUMENTS

| | | | | |
|---|---|---|---|---|
| 3,642,331 A | * | 2/1972 | Silver ............... | F16C 21/00 384/126 |
| 3,854,781 A | * | 12/1974 | Bildtsen ............ | F16C 21/00 384/126 |
| 3,999,897 A | * | 12/1976 | Strub ............... | F16C 23/08 384/618 |

FOREIGN PATENT DOCUMENTS

JP      2009-019728 A      1/2009

* cited by examiner

*Primary Examiner* — Ahmed Elnakib
*Assistant Examiner* — Mohammed Ahmed Qureshi
(74) *Attorney, Agent, or Firm* — XSENSUS LLP

(57) ABSTRACT

A motor bearing system has: a slide bearing operable as a gas-lubricated bearing by gas supplied from a pump; a rolling bearing; and a controller. The controller controls the pump such that, when the motor rotation speed is equal to or higher than the first speed and is lower than the second speed, the slide bearing functions as a bearing that supports the rotary shaft and the slide bearing is operated as the gas-lubricated bearing, and when the motor rotation speed is equal to or higher than the second speed, the pump is stopped. In addition, even in the case where the motor rotation speed is equal to or higher than the second speed, the controller does not stop the pump when a radial load applied to the rotary shaft of the motor is equal to or larger than a predetermined value.

16 Claims, 13 Drawing Sheets

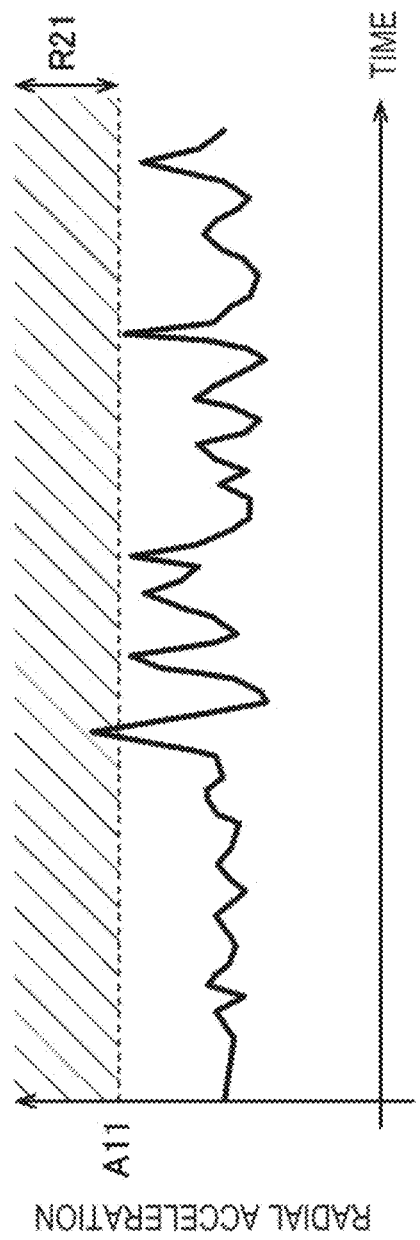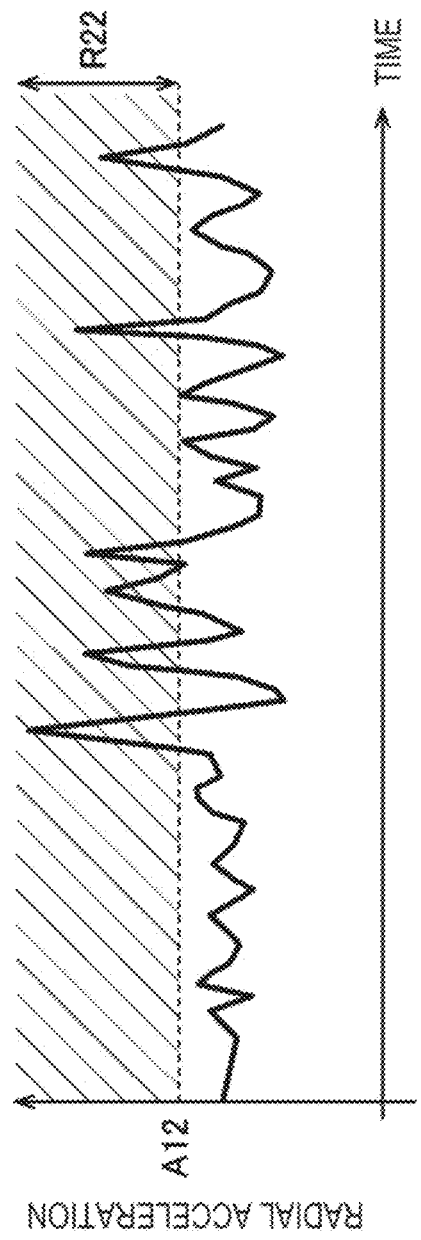

FIG. 15
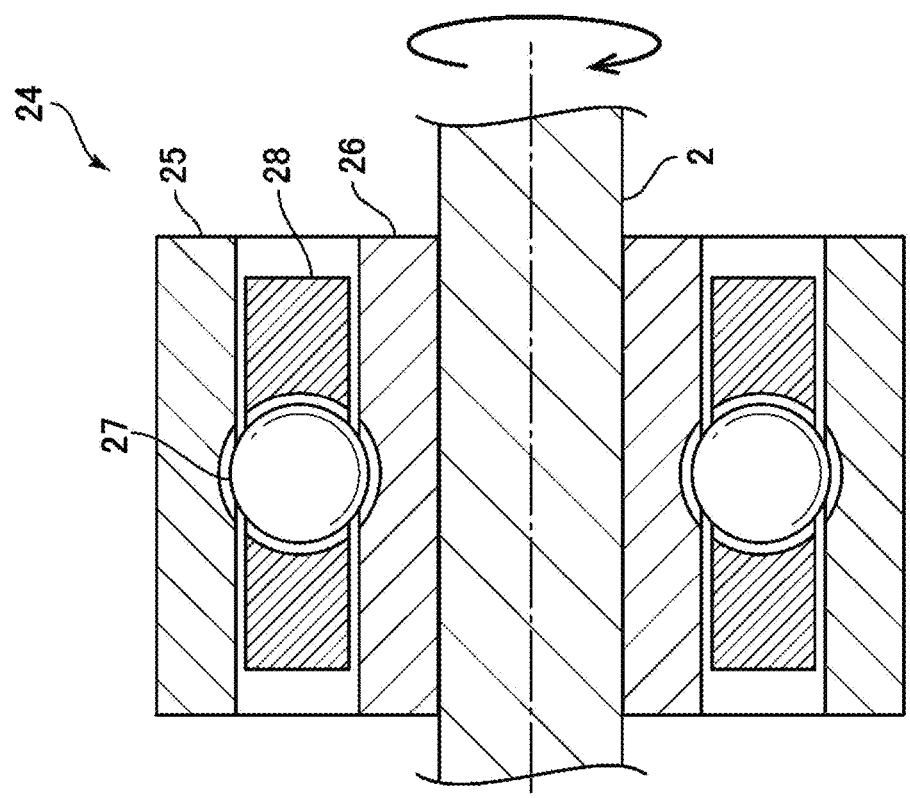
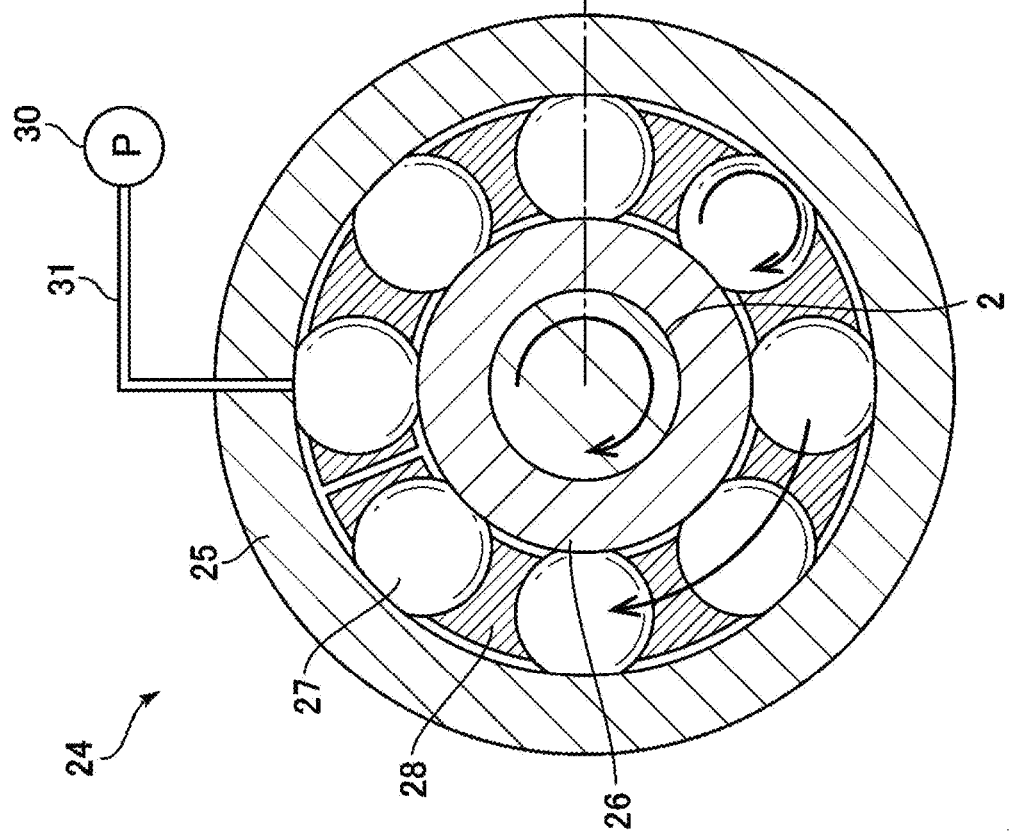

FIG. 16
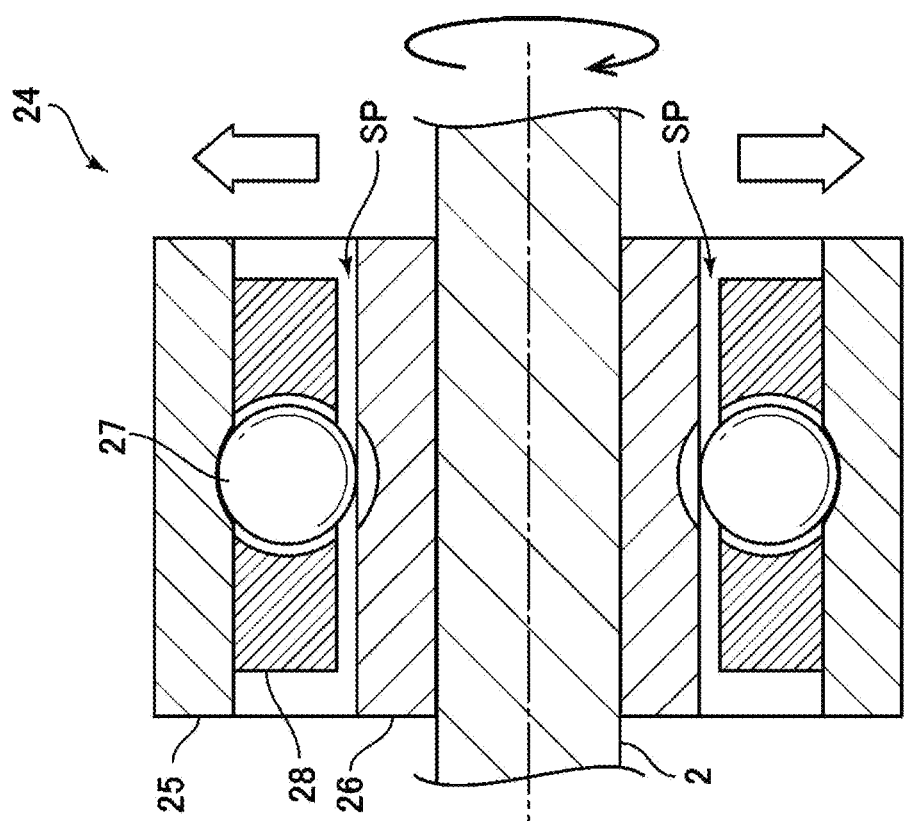
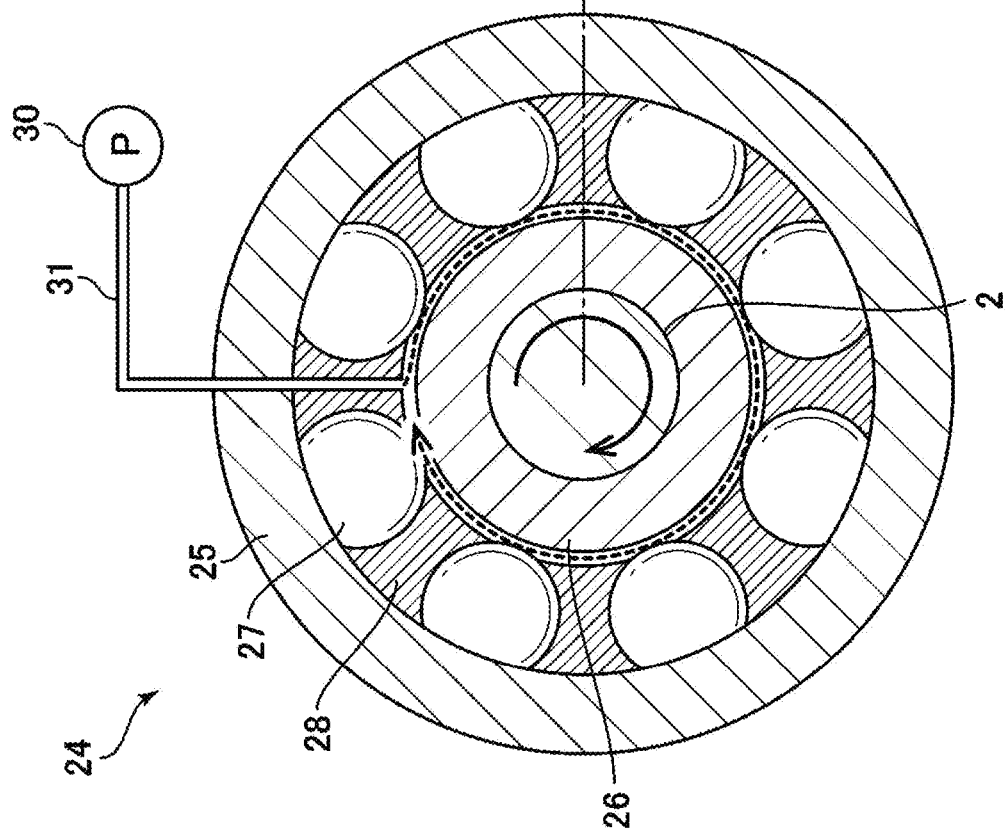

MOTOR BEARING SYSTEM

CROSS-REFERENCE TO RELATED APPLICATION

The present application claims priority to Japanese Patent Application 2023-046468, filed Mar. 23, 2023, the entire contents of which are incorporated herein by reference.

BACKGROUND

Field

The present disclosure relates to a motor bearing system.

Description of the Related Art

A rolling bearing and a slide bearing have been used as bearings, each of which supports a rotary shaft of a power source (an engine or a motor) or the like of a vehicle, for example. While the rolling bearing has low friction in a low-speed range, the slide bearing has high friction in the low-speed range. Meanwhile, while the rolling bearing has a finite life due to rolling contact fatigue, the slide bearing has an infinite life under an appropriate lubrication condition.

Here, the following technique has been proposed. A system having both of the rolling bearing and the slide bearing is configured to switch the applied bearing according to characteristics of each of the bearings as described above. For example, a system using the rolling bearing and the slide bearing as the bearing that supports a crankshaft or a camshaft of the engine is disclosed in Patent Literature 1. In such a system, only the rolling bearing functions at a start at a low rotational frequency, and only the slide bearing functions after this start.

CITATION LIST

Patent Literature

[Patent Literature 1] JP2009-19728A

SUMMARY

As described above, in the engine, application of the slide bearing is effective in a high-speed range. Fluid lubrication with lubricating oil is generally used for this slide bearing. By the way, the motor that is operated at the higher speed than the engine has such a problem that, when such a slide bearing is applied in the high-speed range of the motor, fluid friction and resistance of the lubricating oil are increased, which worsens electric efficiency of the motor.

In order to solve such a problem, the present inventor has considered to apply a gas-lubricated bearing (for example, an air bearing), for which lubrication (gaseous lubrication) with gas having lower viscosity than the lubricating oil is used, as the slide bearing. In order to realize such a gas-lubricated bearing, a gas layer has to be reliably formed between the bearing and the rotary shaft in order to prevent contact therebetween. It is considered that a so-called wedge effect and a so-called restriction effect are preferably used to form this gas layer. However, the wedge effect and the restriction effect can only basically be exerted in the high-speed range. Thus, in a method using these effects, the bearing and the rotary shaft possibly contact each other in the low-speed range.

In view of the above, in order to reliably form the gas layer for the gas-lubricated bearing in the low-speed range, the present inventor has considered to apply a static pressure to the bearing by a pump. However, since electricity consumption by the pump worsens the electric efficiency, it is desired to minimize actuation of the pump. Here, the gas layer is formed according to a combination of the static pressure, which is applied by the pump, and a pressure generated by the wedge effect and the restriction effect described above. These effects are determined by the viscosity of the gas, a sliding speed, and the pressure. In addition, degrees of occurrence of these effects can be comprehended from the motor rotation speed (uniquely, the rotational frequency; hereinafter the same).

From an experiment performed by the present inventor, it is found that, since the wedge effect and the restriction effect cannot be exerted in the low-speed range of the motor, an electric efficiency improvement allowance obtained by applying the gas-lubricated bearing is smaller than an electric efficiency reduction allowance obtained by actuating the pump to realize the gas-lubricated bearing, and thus the gas-lubricated bearing should not be applied. Meanwhile, it is also found that, in the high-speed range of the motor where the sliding speed becomes extremely high, the significant wedge effect and restriction effect can be exerted, and thus the gas-lubricated bearing can be realized without applying the static pressure by the pump. From the findings described so far, the present inventor has considered to actuate the pump in a range (referred to as a middle-speed range) between the low-speed range and the high-speed range while stopping the pump or reducing a driving force of the pump in the high-speed range in order to realize the gas-lubricated bearing.

In addition, from a further experiment performed by the present inventor, it has been found that, when a radial load applied to the rotary shaft of the motor is large, it is difficult to secure the gas layer between the bearing and the rotary shaft, and thus the bearing possibly contacts the rotary shaft. For example, the radial load is increased during travel on a rough road, during travel over a bump, when a steering angle is large, or the like. Based on such findings, the present inventor has conceived of executing control for the pump, which is used to realize the gas-lubricated bearing, in consideration of the radial load applied to the rotary shaft of the motor, and has completed the disclosure.

The disclosure has been made on the basis of the findings as described so far and therefore has a purpose of precisely executing control for a pump on the basis of a radial load applied to a rotary shaft of a motor in a motor bearing system that has a bearing operable as a gas-lubricated bearing by gas supplied from the pump.

Solution to Problem

In order to achieve the above purpose, the disclosure is a motor bearing system and has: a rolling bearing that supports a rotary shaft of a motor; a slide bearing that is arranged in parallel with the rolling bearing on an axis of the rotary shaft to support the rotary shaft, the slide bearing being operable as a gas-lubricated bearing that achieves gaseous lubrication with gas supplied to the slide bearing; a pump that supplies the gas to the slide bearing; a detector that detects a rotation speed of the motor; and a controller that controls the pump on the basis of the rotation speed detected by the detector. The controller: controls the pump such that, when the rotation speed is equal to or higher than a first speed and is lower than a second speed that is higher than the first speed, the rolling bearing does not function as a bearing that supports the rotary shaft, but the slide bearing functions as the bearing that supports the rotary shaft, and the slide bearing functions as the gas-lubricated bearing; and controls the pump to stop the pump or reduce a driving force of the pump to be smaller than that at the time when the rotation speed is equal to or higher than the first speed and lower than the second speed in the case where the rotation speed is equal to or higher than the second speed. The controller further controls the pump such that, in the case where the rotation speed is equal to or higher than the second speed and a radial load exerted on the rotary shaft is equal to or larger than a predetermined value, the pump is not stopped, and the driving force of the pump is increased to be larger than that at the time when the radial load is smaller than the predetermined value.

In the disclosure that is configured as described above, the controller comprehends magnitudes of exertion of a wedge effect and a restriction effect from the motor rotation speed and executes the control related to the bearing. The motor rotation speed precisely reflects the magnitudes of the exertion of the wedge effect and the restriction effect. Thus, according to the disclosure, this control can be executed accurately with the simple configuration.

More specifically, in the disclosure, when the motor rotation speed is equal to or higher than the first speed and is lower than the second speed, the wedge effect and the restriction effect are exerted to a certain extent. For this reason, the electricity consumption of the pump that is required to operate the slide bearing as the gas-lubricated bearing is relatively small. Thus, the controller applies the slide bearing as the bearing that functions to support the rotary shaft. In this case, an electric efficiency improvement allowance, which is obtained by applying the slide bearing as the gas-lubricated bearing, becomes larger than an electric efficiency reduction allowance, which is obtained by actuating the pump to realize the gas-lubricated bearing. Thus, it is possible to ensure an electric efficiency improvement effect, which is exerted by applying the gas-lubricated bearing.

In addition, in the disclosure, when the motor rotation speed is equal to or higher than the second speed, the sliding speed is extremely high, and the gas-lubricated bearing can be realized without applying the static pressure by the pump. Thus, the controller applies the slide bearing as the bearing that functions to support the rotary shaft while stopping the pump or reducing the driving force of the pump. In this way, it is possible to maximize the electric efficiency improvement effect, which is exerted by applying the gas-lubricated bearing.

Furthermore, in the disclosure, even in the case where the motor rotation speed is equal to or higher than the second speed, the pump is not stopped, and the pump driving force is increased to be larger than that at the time when the radial load (uniquely corresponding to the radial acceleration) applied to the rotary shaft is smaller than the predetermined value when the radial load is equal to or larger than the predetermined value. Thus, when the radial load is large, it is possible to avoid a contact risk of the slide bearing with the rotary shaft and thus to ensure safety and reliability. An electric efficiency reduction allowance at the time of executing such control for the pump driving force is smaller than the electric efficiency reduction allowance obtained due to the contact between the slide bearing and the rotary shaft, which possibly occurs when the control for the pump driving force is not executed. Thus, it is possible to suppress an electric efficiency reduction as much as possible.

From another perspective, in order to achieve the above purpose, the disclosure is a motor bearing system and has: a bearing that includes plural rolling elements and supports a rotary shaft of a motor, the bearing being operated as a rolling bearing or being operated as a gas-lubricated bearing that achieves gaseous lubrication with gas supplied to the bearing; a pump that supplies the gas to the bearing; a detector that detects a rotation speed of the motor; and a controller that controls the pump on the basis of the rotation speed detected by the detector. The controller: controls the pump such that, when the rotation speed is equal to or higher than a first speed and is lower than a second speed that is higher than the first speed, the bearing is operated as the gas-lubricated bearing; and controls the pump such that, in the case where the rotation speed is equal to or higher than the second speed, the pump is stopped or a driving force of the pump is reduced to be smaller than that at the time when the rotation speed is equal to or higher than the first speed and lower than the second speed. The controller further controls the pump such that, in the case where the rotation speed is equal to or higher than the second speed and a radial load exerted on the rotary shaft is equal to or larger than a predetermined value, the pump is not stopped, and the driving force of the pump is increased to be larger than that at the time when the radial load is smaller than the predetermined value.

Also, by the disclosure that is configured as described above, it is possible to precisely execute the control for the pump on the basis of the radial load applied to the rotary shaft of the motor. In particular, in the disclosure described above, the single bearing is selectively operated as the rolling bearing or the gas-lubricated bearing. Thus, it is possible to execute the control for the pump with the simple configuration.

In the disclosure, preferably, the controller increases the driving force of the pump as the radial load is increased.

According to the disclosure that is configured as described above, when the radial load is large, it is possible to effectively avoid the contact risk of the bearing with the rotary shaft.

In the disclosure, preferably, the controller predicts the radial load on the basis of a steering angle of a vehicle mounted with the motor bearing system.

According to the disclosure that is configured as described above, the future radial load that is predicted on the basis of the steering angle is used. In this way, it is possible to effectively avoid the contact of the bearing with the rotary shaft, which is caused by an increase in the radial load.

In the disclosure, preferably, the controller predicts the radial load on the basis of a bump on a road surface on which a vehicle mounted with the motor bearing system travels.

According to the disclosure that is configured as described above, the future radial load that is predicted on the basis of the bump on the road surface is used. In this way, it is possible to effectively avoid the contact of the bearing with the rotary shaft, which is caused by the increase in the radial load.

In the disclosure, preferably, the controller predicts the radial load on the basis of a condition of a road surface on which a vehicle mounted with the motor bearing system travels.

According to the disclosure that is configured as described above, the future radial load that is predicted on the basis of the condition of the road surface is used. In this way, it is possible to effectively avoid the contact of the bearing with the rotary shaft, which is caused by the increase in the radial load.

In the disclosure, preferably, when the rotation speed is equal to or higher than the first speed and is lower than the second speed, the controller reduces the driving force of the pump as the rotation speed is increased.

According to the disclosure that is configured as described above, when the motor rotation speed is equal to or higher than the first speed and is lower than the second speed, it is possible to reduce electricity consumption by the pump to realize the gas-lubricated bearing and thus to improve electric efficiency.

In the disclosure, preferably, the controller further controls the driving force of the pump on the basis of a vehicle speed of a vehicle mounted with the motor bearing system.

In the case where the radial load is generated, it is more difficult to secure the gas layer between the bearing and the rotary shaft at the high vehicle speed than at the low vehicle speed, and thus a possibility that the bearing contacts the rotary shaft is increased. Thus, in the disclosure, the driving force of the pump is controlled according to the vehicle speed. Typically, the driving force of the pump is increased as the vehicle speed is increased. In this way, it is possible to effectively avoid the contact risk of the bearing with the rotary shaft when the radial load is large.

Advantages

According to the disclosure, it is possible to precisely execute the control for the pump on the basis of the radial load applied to the rotary shaft of the motor in the motor bearing system that has the bearing operable as the gas-lubricated bearing with the gas supplied from the pump.

BRIEF DESCRIPTION OF THE DRAWINGS

The scope of the present disclosure is best understood from the following detailed description of exemplary embodiments when read in conjunction with the accompanying drawings.

FIGS. 13A and 13B are graphs for motor bearing control according to the second embodiment of the disclosure.

FIG. 15 includes cross-sectional views illustrating a state of a rolling bearing at the time when a pump is not actuated in the motor bearing system according to the third embodiment of the disclosure.

FIG. 16 includes cross-sectional views illustrating the state of the rolling bearing at the time when the pump is actuated in the motor bearing system according to the third embodiment of the disclosure.

DETAILED DESCRIPTION

A description will hereinafter be made on a motor bearing system according to embodiments of the disclosure with reference to the accompanying drawings.

First Embodiment

Figure 1:
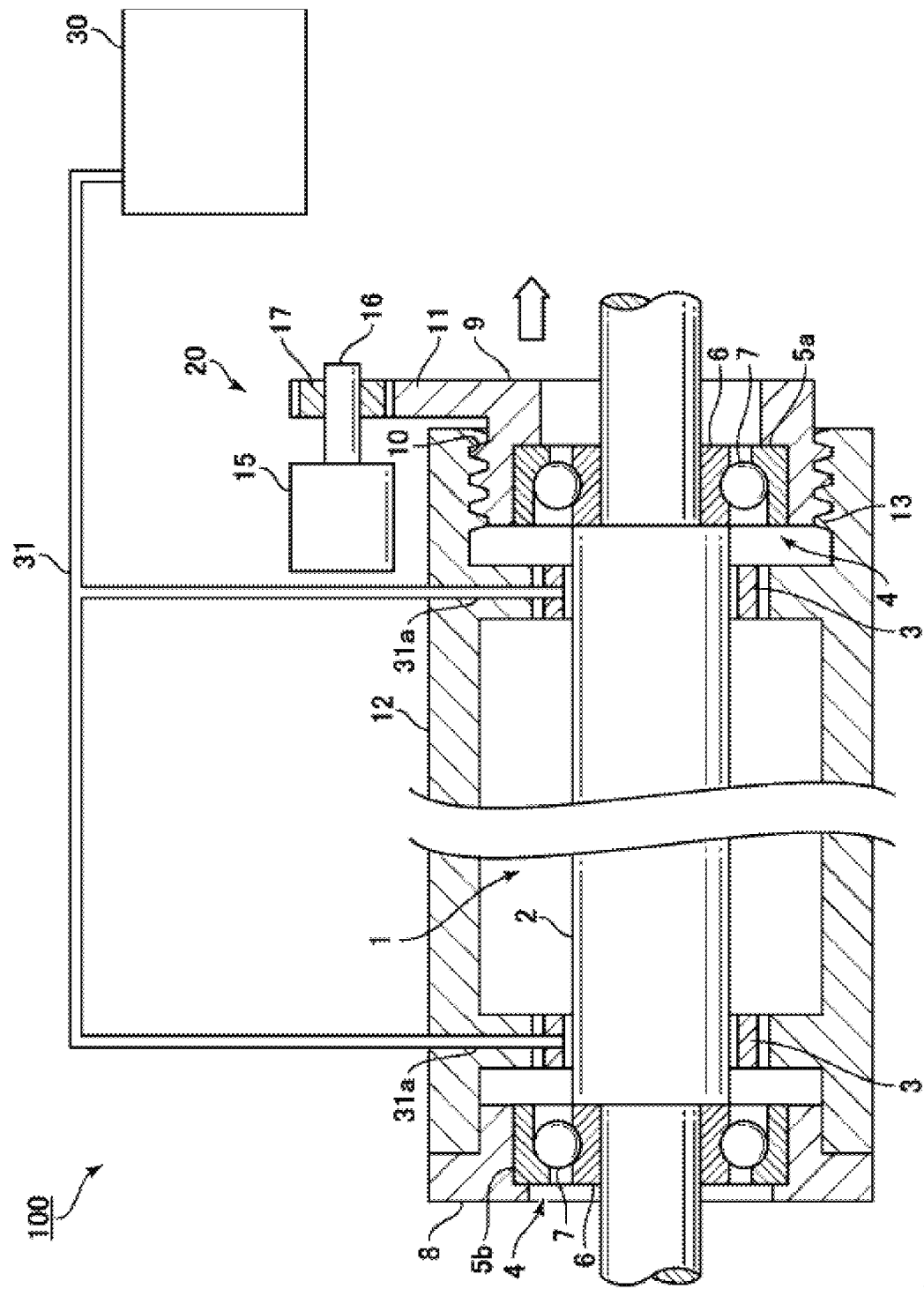
FIG. 1 is a schematic configuration view of a motor bearing system according to a first embodiment of the disclosure.
Figure 2:
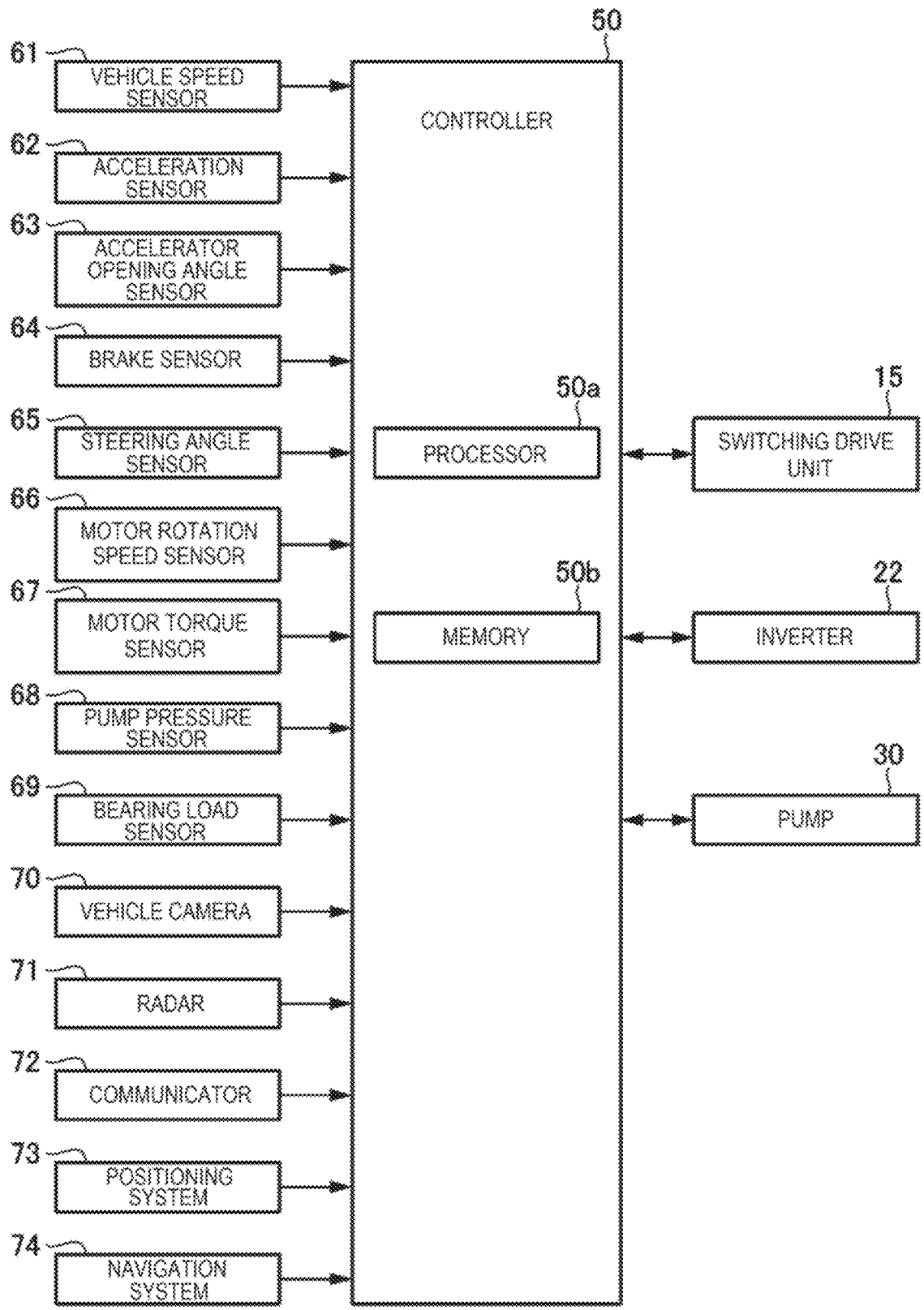
FIG. 2 is a block diagram illustrating an electric configuration of the motor bearing system according to the first embodiment of the disclosure.

A description will herein be made on a first embodiment of the disclosure. First, a description will be made on a configuration of a motor bearing system according to the first embodiment with reference to FIGS. 1 and 2. FIG. 1 is a schematic configuration view of the motor bearing system according to the first embodiment. FIG. 2 is a block diagram illustrating an electric configuration of the motor bearing system according to the first embodiment.

As illustrated in FIG. 1, a motor bearing system 100 is mounted to a vehicle and mainly has: a motor 1 that drives the vehicle; a rotary shaft 2 of the motor 1; a pair of slide bearings 3 that supports the rotary shaft 2; a pair of rolling bearings 4 that is arranged in parallel with the slide bearings 3 on an axis of the rotary shaft 2 and supports the rotary shaft 2; and a housing 12 that accommodates the motor 1, rotary shaft 2, slide bearings 3, and rolling bearings 4.

The rolling bearings 4 are angular ball bearings, for example, and respectively have: outer rings 5a, 5b; inner rings 6 that are attached to the rotary shaft 2; and plural rolling elements (balls and rollers) 7 that are interposed between the inner ring 6 and respective one of these outer rings 5a, 5b. The outer ring 5b of the rolling bearing 4 on a left end side of the rotary shaft 2 is attached to an inner circumferential side of a cylindrical outer ring fixture member 8 while the outer ring 5a of the rolling bearing 4 on a right end side of the rotary shaft 2 is attached to an inner circumferential side of a cylindrical outer ring movable member 9. The latter outer ring movable member 9 has a thread groove 10 on an outer circumference at one end and has a fan-shaped gear 11 on the outer circumference at the other end.

The thread groove 10 of the outer ring movable member 9, to which the outer ring 5a is attached, is threaded onto a thread groove 13 that is formed on an inner circumference at a right end of the housing 12. The outer ring fixture member 8, to which the outer ring 5b is attached, is fixed to a left end of the housing 12. A switching drive unit 15 that has a motor and a decelerator therein is provided on an outer circumference on the right end side of such a housing 12.

This switching drive unit 15 has a drive shaft 16 and a drive gear 17 fixed to this drive shaft 16, and this drive gear 17 meshes with the fan-shaped gear 11 of the outer ring movable member 9.

The motor bearing system 100 further has a pump 30 that supplies gas (typically air but may be oil gas or a refrigerant) to the slide bearing 3 in order to form a gas layer between the rotary shaft 2 and the slide bearing 3 and thereby achieve gaseous lubrication of the slide bearing 3, that is, to cause the slide bearing 3 to float off the rotary shaft 2 and be operated as a gas-lubricated bearing. More specifically, the pump 30 supplies the gas through a gas supply passage 31 to a clearance (a radial clearance that is defined in a radial direction of the rotary shaft 2) between the rotary shaft 2 and each of the paired slide bearings 3. In this gas supply passage 31, a downstream portion 31a that is connected to the slide bearing 3 is formed in the housing 12 and each of the slide bearings 3. In this way, for example, each of the slide bearings 3 can float between an outer circumferential surface of the rotary shaft 2 and an inner circumferential surface of the housing 12 that surrounds the rotary shaft 2 and the slide bearings 3.

The outer ring movable member 9 (including the thread groove 10 and the fan-shaped gear 11), the thread groove 13 of the housing 12, and the switching drive unit 15 (including the drive shaft 16 and the drive gear 17) described above constitute a switching mechanism 20 that switches the bearing, which functions to support the rotary shaft 2, between the rolling bearing 4 and the slide bearing 3.

A description will herein be made on bearing switching operation by the switching mechanism 20. First, in a basic state of the rolling bearing 4 where the rolling element 7 is in contact with respective one of the outer rings 5a, 5b and the inner ring 6, the rolling bearing 4 functions as the bearing that supports the rotary shaft 2. In this state, the radial clearance is generated between the slide bearing 3 and the rotary shaft 2, and the slide bearing 3 does not contact the rotary shaft 2. Thus, the slide bearing 3 does not function as the bearing that supports the rotary shaft 2. In summary, the above-described state corresponds to a state (a first state) where the rolling bearing 4 functions as the bearing supporting the rotary shaft 2 and the slide bearing 3 does not function as the bearing supporting the rotary shaft 2.

Next, when the switching drive unit 15 of the switching mechanism 20 causes the drive gear 17 to rotate via the drive shaft 16, the fan-shaped gear 11 that meshes with the drive gear 17 rotates, and the thread groove 10 coupled to this fan-shaped gear 11 also rotates. Consequently, the thread groove 10 moves rightward in FIG. 1 in an axial direction along the thread groove 13 of the housing 12. In this way, the entire outer ring movable member 9, which has the thread groove 10 and the fan-shaped gear 11, moves rightward. As a result, the outer ring 5a also moves rightward, and thus the outer ring 5a separates from the rolling element 7 (that is, no longer in contact therewith). In addition, when the outer ring 5a (the outer ring 5a of the rolling bearing 4 on the right end side of the rotary shaft 2) moves, just as described, the rotary shaft 2 also moves rightward. As a result, the inner ring 6 of the rolling bearing 4, which is provided on the left end side of the rotary shaft 2, moves to cause the outer ring 5b of the rolling bearing 4 to separate from the rolling element 7 (that is, no longer in contact therewith). When the switching mechanism 20 is operated as described so far, that is, when the switching drive unit 15 of the switching mechanism 20 is driven, the rolling bearing 4 no longer functions as the bearing that supports the rotary shaft 2.

Meanwhile, in a state where the outer rings 5a, 5b separate from the rolling elements 7 in the rolling bearings 4 as described above, a radial clearance is generated in each of the rolling bearings 4. This radial clearance is larger than the above-described radial clearance between the slide bearing 3 and the rotary shaft 2. Accordingly, the rotary shaft 2 and the like move downward due to own weight and an external load, which allows the rotary shaft 2 to contact the slide bearing 3. As a result, the slide bearing 3 is brought into a state of functioning as the bearing that supports the rotary shaft 2. Basically, in this embodiment, in such a state, the gas is supplied from the pump 30 to form the gas layer between the rotary shaft 2 and the slide bearing 3 as described above. Thus, the slide bearing 3 does not contact the rotary shaft 2. In summary, the state as described so far, that is, the state where the switching drive unit 15 of the switching mechanism 20 is driven corresponds to a state (a second state) where the slide bearing 3 functions as the bearing that supports the rotary shaft 2 and the rolling bearing 4 does not function as the bearing that supports the rotary shaft 2.

In the above example, the gear, the thread groove, and the like are used to cause the outer ring 5a to move. However, in another example, a predetermined push-out mechanism may be used to cause the outer ring 5a to move. In this example, the push-out mechanism only needs to apply a push-out force to the outer ring 5a, which is in an urged state by a spring, and an amount of the push-out force is large enough to overcome an urging force of this spring. In the above example, the outer rings 5a, 5b separate from the rolling elements 7. However, in further another example, instead of the outer rings 5a, 5b, the inner rings 6 may separate from the rolling elements 7.

Next, as illustrated in FIG. 2, the motor bearing system 100 has: various sensors 61 to 74; a controller 50 that receives various signals from these various sensors; and the above-described switching drive unit 15, the above-described pump 30, and an inverter 22 that are controlled by a control signal supplied from this controller 50. The inverter 22 is connected to the motor 1. The controller 50 is implemented by a computer that includes: one or more processors 50a (typically CPUs); and memory 50b, such as ROM and RAM, that stores various programs (including a basic control program such as an OS and an application program activated on the OS to implement a particular function) interpretively executed on the processor 50a and various types of data.

More specifically, the motor bearing system 100 has: a vehicle speed sensor 61 that detects a speed of the vehicle (a vehicle speed); an acceleration sensor 62 that detects acceleration of the vehicle; an accelerator opening angle sensor 63 that detects an accelerator opening angle corresponding to a depression amount of an accelerator pedal; a brake sensor 64 that detects a depression amount of a brake pedal; a steering angle sensor 65 that detects a rotation angle (a steering angle) of a steering wheel; a motor rotation speed sensor 66 that detects a rotation speed (uniquely a rotational frequency) of the motor 1; a motor torque sensor 67 that detects torque of the motor 1; a pump pressure sensor 68 that detects a pressure of the pump 30; and a bearing load sensor 69 that detects a load (a radial load) applied in the radial direction to each of the slide bearing 3 and the rolling bearing 4. The motor rotation speed sensor 66 corresponds to the "detector" in the disclosure.

Furthermore, the motor bearing system 100 has: a vehicle camera 70 that captures an image of the surroundings of the vehicle; a radar 71 (for example, a millimeter-wave radar) that measures a location and a speed of a target object (another vehicle, a pedestrian, an obstacle, or the like) that exists around the vehicle; a communicator 72 that makes inter-vehicle communication and road-to-vehicle communication; a positioning system 73 that includes a GPS system, a gyroscopic system, or the like to detect a location of the vehicle; and a navigation system 74 that stores map data. Instead of the radar 71, a laser radar, an ultrasonic sensor, or the like may be used.

Figure 3:
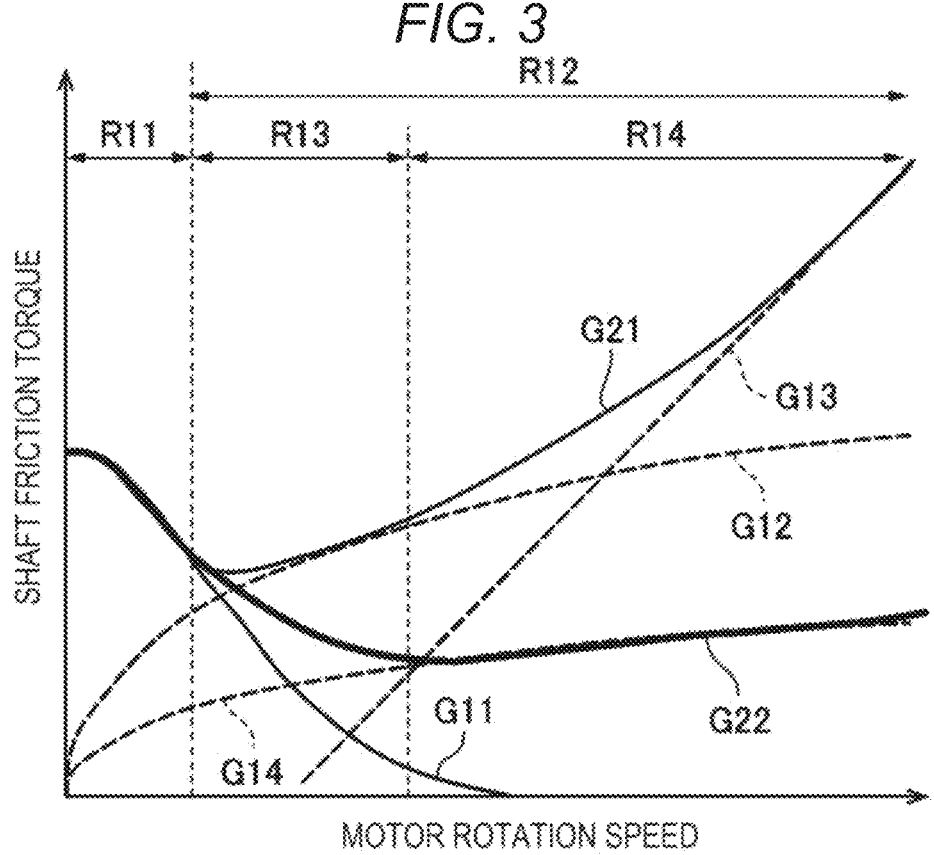
FIG. 3 is a graph for a basic concept of motor bearing control according to the first embodiment of the disclosure.

Next, a description will be made on a basic concept of motor bearing control according to the first embodiment with reference to FIG. 3. A description will herein be made by contrasting the motor bearing control according to the first embodiment with motor bearing control according to a comparative example. In FIG. 3, a horizontal axis represents the motor rotation speed, and a vertical axis represents shaft friction torque.

In the motor bearing control according to the comparative example, the bearing that functions to support the rotary shaft of the motor is switched between the rolling bearing and the slide bearing, for which fluid lubrication with lubricating oil is used. More specifically, in the comparative example, when the motor rotation speed is in a range R11 (hereinafter appropriately referred to as a "low-speed range", the rolling bearing is applied as the bearing that functions to support the rotary shaft 2. Meanwhile, when the motor rotation speed is in a higher range R12 than the low-speed range R11, the slide bearing is applied as the bearing that functions to support the rotary shaft 2. This control corresponds to the technique disclosed in Patent Literature 1.

In FIG. 3, a graph G11 indicates the shaft friction torque that is generated to the rolling bearing, that is, boundary lubrication friction due to direct contact, and a graph G12 indicates the shaft friction torque that is generated to the slide bearing, for which the fluid lubrication with the lubricating oil is used, that is, fluid lubrication friction of the lubricating oil. Accordingly, the shaft friction torque that is generated in the motor bearing control according to the comparative example is a sum of the shaft friction torque indicated by the graph G11 and the shaft friction torque indicated by the graph G12, that is, is indicated by a graph G21. In this case, in the range R12, the shaft friction torque is significantly increased as the motor rotation speed is increased. This is because of an increase in the friction due to deformation of the rolling element in the rolling bearing, as indicated by a graph G13.

Meanwhile, in the first embodiment, as described above, the bearing that functions to support the rotary shaft 2 of the motor 1 is switched between the rolling bearing 4 and the slide bearing 3 that is operable as the gas-lubricated bearing with the gas supplied from the pump 30. First, in the low-speed range R11, as described in the section "Technical Problem", the wedge effect and the restriction effect are hardly exerted. Thus, an electric efficiency improvement allowance that can be obtained by applying the slide bearing 3 to be operated as the gas-lubricated bearing becomes smaller than an electric efficiency reduction allowance that is obtained by actuating the pump 30 to realize this gas-lubricated bearing (that is, electricity consumption by the pump 30 is significantly increased). For this reason, in the low-speed range R11, in a stopped state of the pump 30, the controller 50 controls the switching drive unit 15 of the switching mechanism 20 so as to apply the rolling bearing 4 as the bearing that functions to support the rotary shaft 2. In other words, the controller 50 controls the switching drive unit 15 so as not to cause the slide bearing 3 to function but to cause only the rolling bearing 4 to function.

Meanwhile, when such a motor rotation speed exceeds the low-speed range R11, that is, in the higher range R12 than the low-speed range R11, the wedge effect and the restriction effect are exerted to a certain extent. Accordingly, the electric efficiency improvement allowance, which is obtained by applying the slide bearing 3 to be operated as the gas-lubricated bearing, becomes larger than the electric efficiency reduction allowance, which is obtained by actuating the pump 30 to realize this gas-lubricated bearing. Thus, in the range R12, the controller 50 controls the switching drive unit 15 to apply the slide bearing 3 as the bearing that functions to support the rotary shaft 2. In addition, in a range R14, where a sliding speed is extremely high, on a high-speed side in the range R12, the significantly high wedge effect and restriction effect can be exerted. Thus, the gas-lubricated bearing can be realized without applying the static pressure by the pump 30. Accordingly, in the first embodiment, in a range R13 on the low-speed side (hereinafter appropriately referred to as a "middle-speed range") in the range R12 where the slide bearing 3 functions, the controller 50 controls the switching drive unit 15 to cause only the slide bearing 3 to function while actuating the pump 30. Meanwhile, in the range R14 on the high-speed side (hereinafter appropriately referred to as a "high-speed range"), the controller 50 stops the pump 30 and controls the switching drive unit 15 to cause only the slide bearing 3 to function.

In FIG. 3, a graph G14 indicates the shaft friction torque that is generated to the slide bearing 3 operated as the gas-lubricated bearing, that is, the gaseous lubrication friction. Accordingly, the shaft friction torque that is generated in the motor bearing control according to the above first embodiment is a sum of the shaft friction torque indicated by the graph G11 and the shaft friction torque indicated by the graph G14, that is, is indicated by a graph G22. When the shaft friction torque according to the first embodiment, which is indicated by such a graph G22, is compared to the shaft friction torque according to the comparative example, which is indicated by the graph G21, it is understood that the shaft friction torque is significantly reduced in the first embodiment. Thus, it can be said that, according to the first embodiment, the electric efficiency can effectively be improved in comparison with the comparative example.

Figure 4:
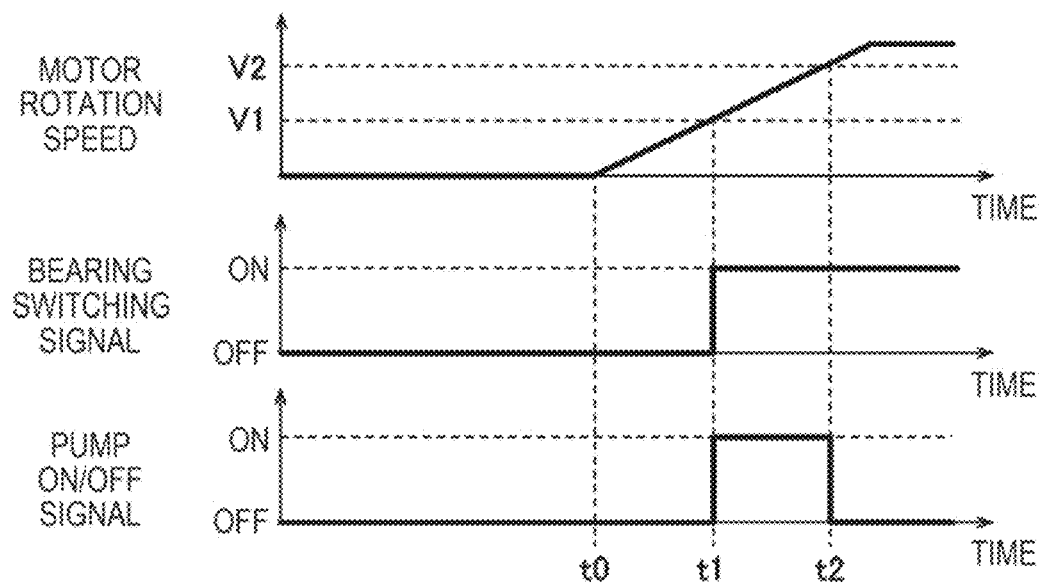
FIG. 4 includes time charts illustrating the motor bearing control according to the first embodiment of the disclosure.

Next, a description will be made on a basic flow of the motor bearing control according to the first embodiment with reference to FIG. 4. FIG. 4 includes time charts illustrating the motor bearing control according to the first embodiment. In FIG. 4, a horizontal axis represents time, and vertical axes sequentially represent, from top, the motor rotation speed, a signal (hereinafter referred to as a "bearing switching signal") that is supplied to the switching drive unit 15 of the switching mechanism 20, and an on/off signal of the pump 30.

As illustrated in FIG. 4, when the motor 1 is started at time t0, in an off state of the pump 30, the controller 50 sets the switching mechanism 20 to cause only the rolling bearing 4 to function (in this case, the bearing switching signal supplied to the switching drive unit 15 is off). At time t1, at which the motor rotation speed reaches a first speed V1 corresponding to a lower limit value of the middle-speed range R13, the controller 50 turns on the bearing switching signal supplied to the switching drive unit 15 and thereby causes only the slide bearing 3 to function, that is, switches the bearing that functions to support the rotary shaft 2 of the motor 1 from the rolling bearing 4 to the slide bearing 3. Almost at the same time, the controller 50 turns on the pump 30 to form the gas layer between the rotary shaft 2 and the slide bearing 3 by the gas from the pump 30, and operates the slide bearing 3 as the gas-lubricated bearing. In consideration of a time until the desired pump pressure is generated, the pump 30 may be turned on (the pump signal may be turned on) before the bearing switching signal is turned on.

Then, at time t2 at which the motor rotation speed reaches a second speed V2 corresponding to a lower limit value of the high-speed range R14, the controller 50 turns off the pump 30 while turning on the bearing switching signal supplied to the switching drive unit 15. This is because, in the high-speed range R14, the sliding speed is extremely high, the significantly high wedge effect and restriction effect can be exerted, and the gas-lubricated bearing can thereby be realized without actuating the pump 30.

Figure 5:
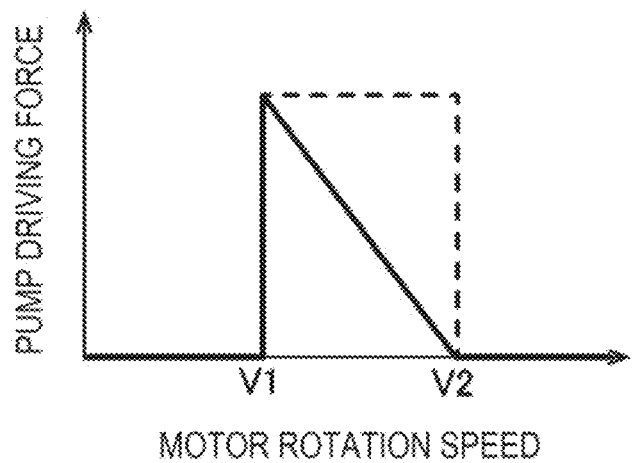
FIG. 5 is a graph for a basic control method of a pump driving force according to the first embodiment of the disclosure.
Figure 6:
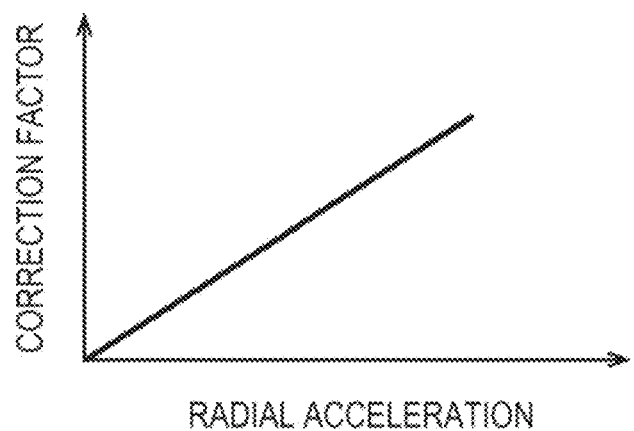
FIG. 6 is a graph for a correction method of the pump driving force according to the first embodiment of the disclosure.
Figure 7:
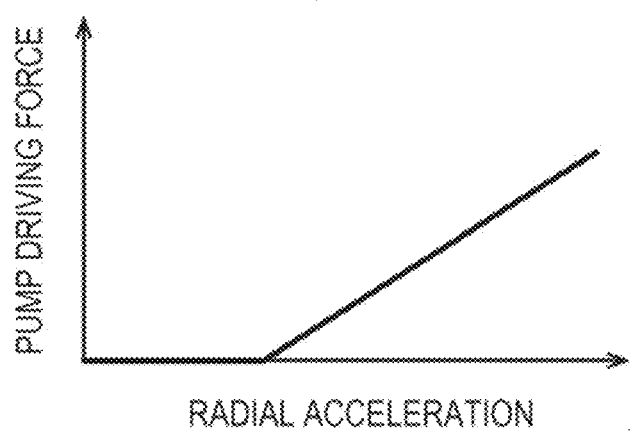
FIG. 7 is a graph for the pump driving force that is applied when radial acceleration is high in a high-speed range in the first embodiment of the disclosure.

Next, a description will be made on a method for controlling a driving force of the pump 30 (a pump driving force) according to the first embodiment with reference to FIG. 5 to FIG. 7. First, FIG. 5 is a graph for a basic control method of the pump driving force according to the first embodiment. In FIG. 5, a horizontal axis represents the motor rotation speed, and a vertical axis represents the pump driving force. As described above, the controller 50 actuates the pump 30 to generate the pump driving force only when the motor rotation speed is equal to or higher than the first speed V1 and lower than the second speed V2 (that is, in the middle-speed range R13). At this time, the controller 50 reduces the pump driving force as the motor rotation speed is increased (see a solid line in FIG. 5). This is because, since the wedge effect and the restriction effect become more significant with the increase in the motor rotation speed, the low static pressure to be supplied from the pump 30 is sufficient enough to operate the slide bearing 3 as the gas-lubricated bearing. When the pump driving force is reduced as the motor rotation speed is increased, just as described, it is possible to reduce the electricity consumption by the pump 30 in the middle-speed range R13 and thus to improve the electric efficiency.

Here, when the motor rotation speed is equal to or higher than the first speed V1 and lower than the second speed V2, the control is not limited to such an example that the pump driving force is reduced as the motor rotation speed is increased (the solid line in FIG. 5). In another example, the pump driving force may be constant regardless of the motor rotation speed (the broken line in FIG. 5).

Next, a description will be made, with reference to FIG. 6, on a method for correcting the pump driving force that is set according to the motor rotation speed as illustrated in FIG. 5. In FIG. 6, a horizontal axis represents radial acceleration that is exerted on the rotary shaft 2 of the motor 1, and a vertical axis represents a correction factor that is used to correct the pump driving force set according to the motor rotation speed. This radial acceleration is also exerted on the slide bearing 3 and the rolling bearing 4. In addition, the radial acceleration uniquely corresponds to the radial load. Thus, the radial load may directly be used instead of the radial acceleration. In such a case, the radial acceleration may be converted to the radial load from vehicle weight or the like (hereinafter the same).

The radial acceleration is increased during travel on a rough road, during travel over a bump, when the steering angle is large, when power hop occurs, or the like, for example. In such a high state of the radial acceleration, it is difficult to secure the gas layer between the slide bearing 3 and the rotary shaft 2. Accordingly, the slide bearing 3 that is operated as the gas-lubricated bearing possibly contacts the rotary shaft 2. For this reason, in the first embodiment, the pump driving force is increased as the radial acceleration is increased. In order to achieve this, as illustrated in FIG. 6, the controller 50 makes a correction to increase the pump driving force, which is set according to the motor rotation speed as illustrated in FIG. 5, by using the correction factor set such that a value thereof is increased as the radial acceleration is increased. In this way, when the radial acceleration is high, it is possible to avoid a contact risk of the slide bearing 3 with the rotary shaft 2 and thus to ensure safety and reliability.

Next, a description will be made on the pump driving force that is applied when the radial acceleration is high in the high-speed range R14 with reference to FIG. 7. In FIG. 7, a horizontal axis represents the radial acceleration that is exerted on the rotary shaft 2 of the motor 1, and a vertical axis represents the pump driving force that is applied according to the radial acceleration in the high-speed range R14. As described above, the controller 50 basically stops the pump 30, that is, does not cause generation of the pump driving force in the high-speed range R14 (that is, when the motor rotation speed is equal to or higher than the second speed V2). However, even in the high-speed range R14, it is difficult to secure the gas layer between the slide bearing 3 and the rotary shaft 2 when the radial acceleration is high. Thus, when the pump 30 is stopped, the slide bearing 3 possibly contacts the rotary shaft 2. Accordingly, in the first embodiment, when the radial acceleration is high, more specifically, when the radial acceleration is equal to or higher than a predetermined value, even in the high-speed range R14, the controller 50 continues to actuate the pump 30, and increases the pump driving force as the radial acceleration is increased as illustrated in FIG. 7. Also, in this way, when the radial acceleration is high, it is possible to avoid the contact risk of the slide bearing 3 with the rotary shaft 2 and thus to ensure the safety and the reliability.

In the first embodiment, the controller 50 predicts the radial acceleration that is used to control the pump driving force as described above. This is because, even when the pump driving force is controlled on the basis of the currently generated radial acceleration (for example, can be calculated from the radial load detected by the bearing load sensor 69), the safety and the reliability cannot adequately be ensured. In other words, this is because the precise pump driving force control cannot be executed in time when the currently generated radial acceleration is used. In particular, this is because the radial acceleration tends to be increased rapidly rather than being gradually increased. Thus, in the first embodiment, the controller 50 predicts the radial acceleration that is generated in the future, and executes the control of the pump driving force on the basis of this radial acceleration.

Figure 8:
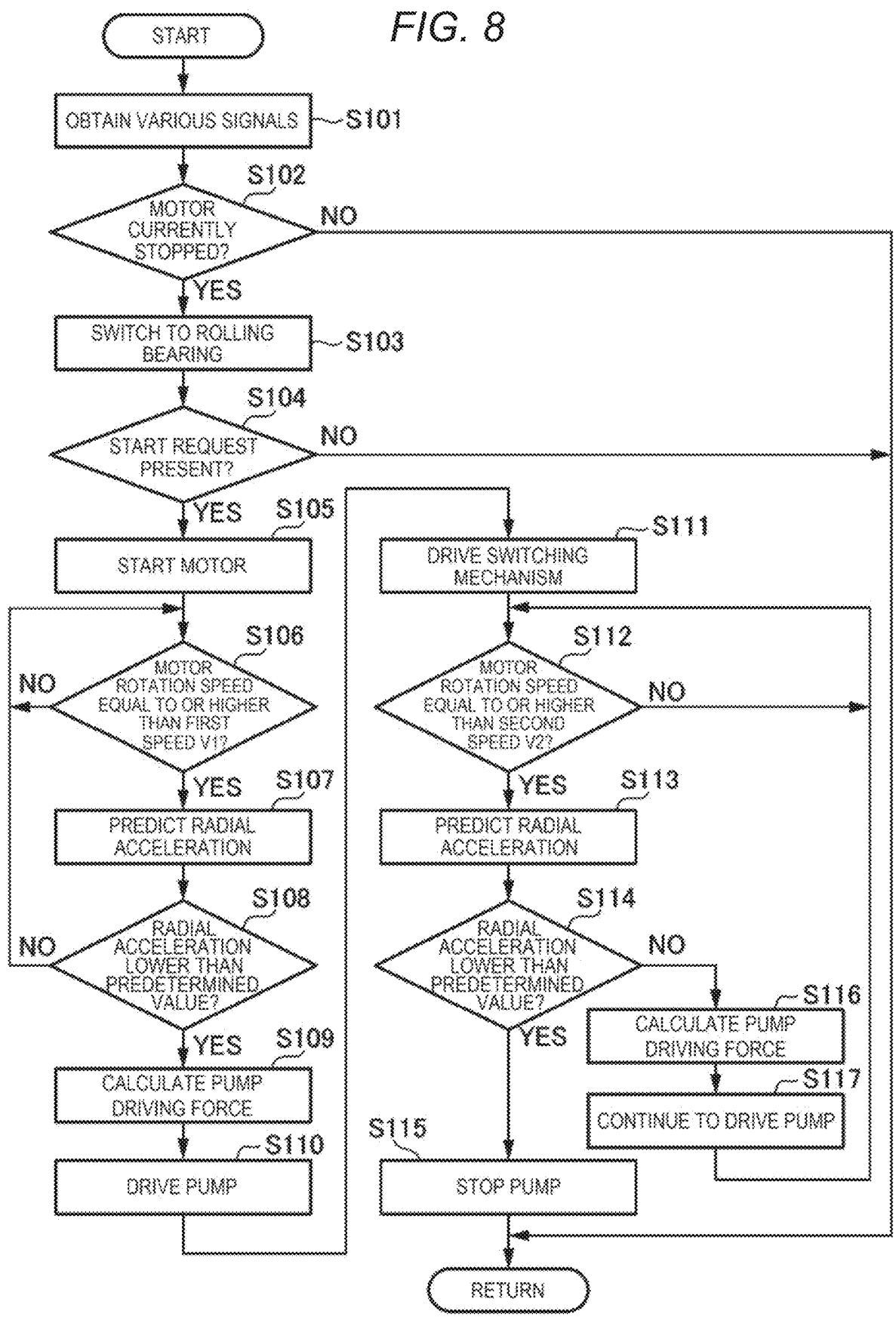
FIG. 8 is a flowchart illustrating the motor bearing control according to the first embodiment of the disclosure.

Next, a description will be made on a specific flow of the motor bearing control according to the first embodiment with reference to FIG. 8. FIG. 8 is a flowchart illustrating the motor bearing control according to the first embodiment. This flow is repeatedly executed by the controller 50 in a predetermined cycle. In more detail, the processor 50a in the controller 50 reads the program stored in the memory 50b to execute the program, and thereby realizes the motor bearing control for this flow.

First, in step S101, the controller 50 obtains the various signals from the various sensors 61 to 74 illustrated in FIG. 2. Then, in step S102, the controller 50 determines whether the motor 1 is stopped. For example, the controller 50 determines whether the motor 1 is stopped on the basis of the motor rotation speed that corresponds to the signal supplied from the motor rotation speed sensor 66. As a result, if the controller 50 determines that the motor 1 is stopped (step S102: Yes), the processing proceeds to step S103. On the other hand, if not determining that the motor 1 is stopped (step S102: No), the controller 50 terminates the motor bearing control.

Next, in step S103, the controller 50 sets the switching drive unit 15 of the switching mechanism 20 so as to apply the rolling bearing 4 as the bearing that functions to support the rotary shaft 2 of the motor 1. For example, in the state where the slide bearing 3 functions to support the rotary shaft 2, the controller 50 controls the switching drive unit 15 so as to switch the bearing that functions to support the rotary shaft 2 from the slide bearing 3 to the rolling bearing 4.

Next, in step S104, the controller 50 determines whether a vehicle start request is present. For example, the controller 50 determines whether the start request is present on the basis of the accelerator opening angle that corresponds to the signal supplied from the accelerator opening angle sensor 63. As a result, if the controller 50 determines that the start request is present (step S104: Yes), the processing proceeds to step S105, and the motor 1 is started. On the other hand, if not determining that the start request is present (step S104: No), the controller 50 terminates the motor bearing control.

Next, in step S106, the controller 50 determines whether the motor rotation speed detected by the motor rotation speed sensor 66 is equal to or higher than the first speed V1, that is, whether the motor rotation speed is in the middle-speed range R13. As a result, if the controller 50 determines that the motor rotation speed is equal to or higher than the first speed V1 (step S106: Yes), the processing proceeds to step S107. On the other hand, if the controller 50 does not determine that the motor rotation speed is equal to or higher than the first speed V1 (step S106: No), the processing returns to step S106.

Next, in step S107, the controller 50 predicts the radial acceleration that is exerted on the rotary shaft 2 of the motor 1. A description will herein be made on a specific example of a method for predicting the radial acceleration that is executed in step S107 with reference to FIG. 9 to FIG. 11.

Figure 9:
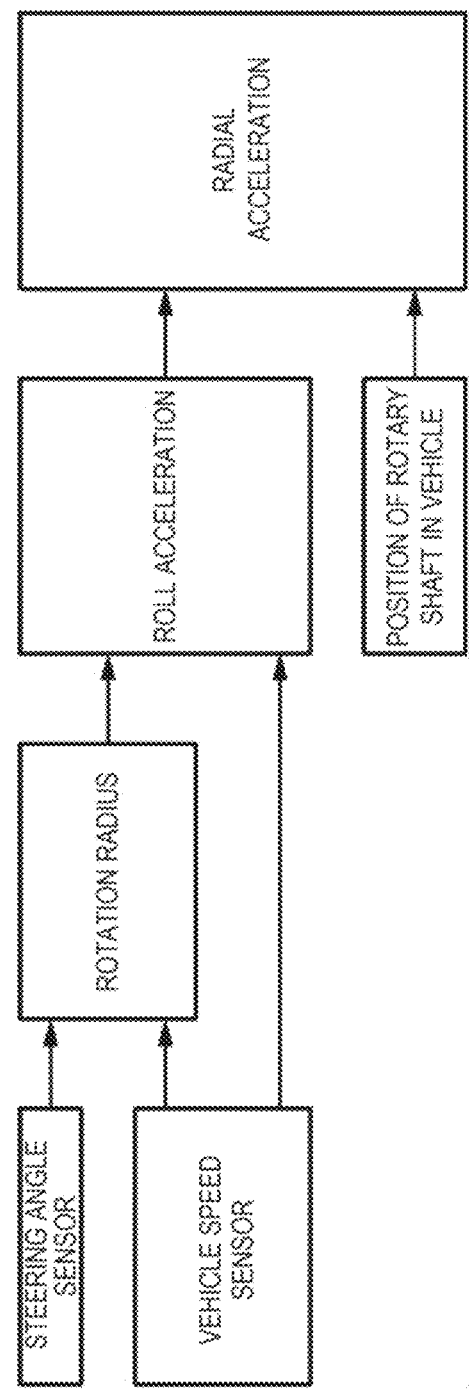
FIG. 9 is a diagram of a first example of a method for predicting the radial acceleration according to the first embodiment of the disclosure.

FIG. 9 is a diagram of a first example of the method for predicting the radial acceleration. The first example is an example in which the radial acceleration is predicted on the basis of the steering angle. As illustrated in FIG. 9, in the first example, the controller 50 first calculates a rotation radius (a turning radius) of the vehicle on the basis of the steering angle detected by the steering angle sensor 65 and the vehicle speed detected by the vehicle speed sensor 61. Then, the controller 50 calculates roll acceleration generated to the vehicle on the basis of this rotation radius and the vehicle speed. The controller 50 then predicts the radial acceleration to be exerted on the rotary shaft 2 in the future on the basis of this roll acceleration and a position of the rotary shaft 2 in the vehicle (is a fixed position and stored in a memory 50b or the like; positions of the slide bearing 3 and the rolling bearing 4 may be used). Basically, the controller 50 predicts the radial acceleration with a higher value as the roll acceleration is increased.

Figure 10:
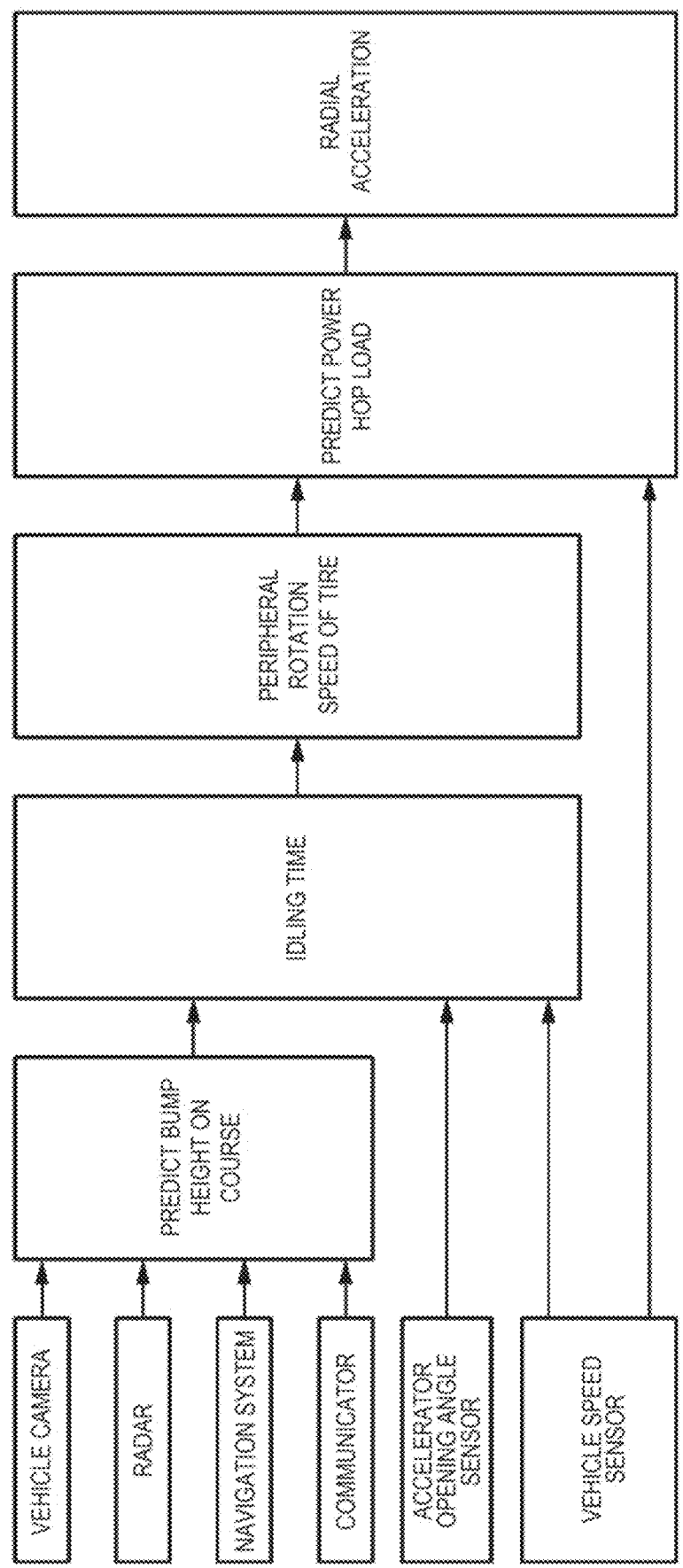
FIG. 10 is a diagram of a second example of a method for predicting the radial acceleration according to the first embodiment of the disclosure.

Next, FIG. 10 is a diagram of a second example of the method for predicting the radial acceleration. The second example is an example in which the radial acceleration is predicted on the basis of the bump (in detail, power hop of the vehicle caused by the bump) on a road surface on which the vehicle travels. As illustrated in FIG. 10, in the second example, the controller 50 first predicts a bump height on a course (in particular, a height of the descending bump) on the basis of the image of the surroundings of the vehicle captured by the vehicle camera 70, the location and the speed of the target object that exists around the vehicle measured by the radar 71, the map data stored in the navigation system 74, the signal obtained by the communicator 72 through the inter-vehicle communication and the road-to-vehicle communication, and the like. Then, the controller 50 calculates an idling time of a tire by the bump on the basis of this bump height, the accelerator opening angle detected by the accelerator opening angle sensor 63, and the vehicle speed detected by the vehicle speed sensor 61, and calculates a peripheral rotation speed of the tire on the basis of this idling time. Next, the controller 50 calculates a power hop load of the vehicle generated by the bump on the basis of this peripheral rotation speed of the tire and the vehicle speed, and predicts the radial acceleration to be exerted on the rotary shaft 2 in the future on the basis of this power hop load. Basically, the controller 50 calculates the longer idling time, the higher peripheral rotation speed, and the larger power hop load as the bump height is increased. As a result, the controller 50 predicts the radial acceleration with the high value.

Figure 11:
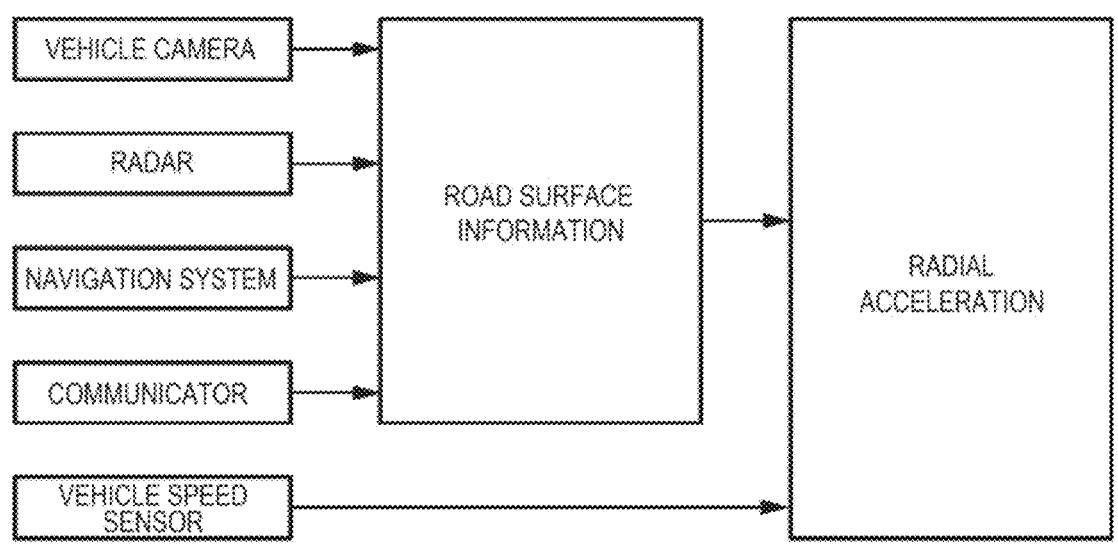
FIG. 11 is a diagram of a third example of a method for predicting the radial acceleration according to the first embodiment of the disclosure.

Next, FIG. 11 is a diagram of a third example of the method for predicting the radial acceleration. The third example is an example in which the radial acceleration is predicted on the basis of a condition of the road surface on which the vehicle travels. As illustrated in FIG. 11, in the third example, the controller 50 first obtains road surface information indicating a condition of the road surface on which the vehicle travels on the basis of the image of the surroundings of the vehicle captured by the vehicle camera 70, the location and the speed of the target object that exists around the vehicle measured by the radar 71, the map data stored in the navigation system 74, the signal obtained by the communicator 72 through the inter-vehicle communication or the road-to-vehicle communication, or the like. For example, the controller 50 obtains, as the road surface information, information on a curve, the rough road, the bump, and the like that exist in the course. In this case, the controller 50 can acknowledge vibration of the own vehicle caused by the rough road through the inter-vehicle communication by the communicator 72. Then, from such road surface information and the vehicle speed, the controller 50 predicts the radial acceleration to be exerted on the rotary shaft 2 in the future. For example, in the case where the road surface condition is that of the rough road, the controller 50 predicts the radial acceleration with a high value that corresponds to a degree of roughness of the road.

The methods for predicting the radial acceleration according to the first to third examples described above may be combined and executed.

Returning to FIG. 8, after the controller 50 predicts the radial acceleration in step S107, the processing proceeds to step S108, and the controller 50 determines whether this radial acceleration is lower than a predetermined value. As a result, if the controller 50 determines that the radial acceleration is lower than the predetermined value (step S108: Yes), the processing proceeds to step S109. On the other hand, if the controller 50 does not determine that the radial acceleration is lower than the predetermined value (step S108: No), the processing returns to step S106. In the latter case, the controller 50 repeats the processing in steps S106 to S108 until the motor rotation speed becomes equal to or higher than the first speed V1 and the radial acceleration becomes lower than the predetermined value.

Next, in step S109, the controller 50 calculates the pump driving force to be applied in order to supply the gas from the pump 30 and operate the slide bearing 3 as the gas-lubricated bearing. More specifically, the controller 50 calculates the pump driving force that corresponds to the current motor rotation speed (FIG. 5), corrects this pump driving force with the correction factor corresponding to the radial acceleration predicted in step S106 (FIG. 6), and thereby calculates the pump driving force to be applied. Then, in step S110, the controller 50 controls the pump 30 by the pump driving force calculated in step S109. Next, in step S111, the controller 50 controls the switching drive unit 15 of the switching mechanism 20 so as to switch the bearing that functions to support the rotary shaft 2 from the rolling bearing 4 to the slide bearing 3.

Next, in step S112, the controller 50 determines whether the motor rotation speed detected by the motor rotation speed sensor 66 is equal to or higher than the second speed V2, that is, whether the motor rotation speed is in the high-speed range R14. As a result, if the controller 50 determines that the motor rotation speed is equal to or higher than the second speed V2 (step S112: Yes), the processing proceeds to step S113. On the other hand, if the controller 50 does not determine that the motor rotation speed is equal to or higher than the second speed V2 (step S112: No), the processing returns to step S112.

Next, in step S113, the controller 50 predicts the radial acceleration that is exerted on the rotary shaft 2 of the motor 1 again. Similar to step S107 described above, the controller 50 predicts the radial acceleration (see FIG. 9 to FIG. 11). Then, in step S114, the controller 50 determines whether this radial acceleration, which is predicted in step S113, is lower than a predetermined value. The predetermined value that is used in this step S114 may be the same as or different from the predetermined value that is used in the determination in step S108. As a result of step S114, if the controller 50 determines that the radial acceleration is lower than the predetermined value (step S114: Yes), the processing proceeds to step S115. In this case, since the motor rotation speed is equal to or higher than the second speed V2 (in the high-speed range R14), the gas-lubricated bearing can be realized without actuating the pump 30. In addition, since the radial acceleration is low, there is no possibility that the slide bearing 3 contacts the rotary shaft 2 when the pump 30 is stopped. Thus, the controller 50 stops the pump 30 (step S115). Then, the controller 50 terminates the motor bearing control.

On the other hand, if the controller 50 does not determine that the radial acceleration is lower than the predetermined value (step S114: No), the processing proceeds to step S116. In step S116, the controller 50 calculates the pump driving force that is applied when the radial acceleration is high in the high-speed range R14. In this case, the controller 50 calculates the pump driving force that corresponds to the radial acceleration predicted in step S113 (FIG. 7). Then, in step S117, the controller 50 continues to drive the pump 30 by using the pump driving force calculated in step S116. Thereafter, the controller 50 returns to step S112.

The pump 30 is stopped in the step S115 as described above. However, as the condition for stopping the pump 30, a condition that a straight road continues on the travel road of the vehicle (for example, such a condition is satisfied during travel on a controlled-access highway) and/or a condition that a flat road surface continues on the travel road of the vehicle may be used. The controller 50 can determine any of such conditions from the image of the surroundings of the vehicle captured by the vehicle camera 70, the map data stored in the navigation system 74, or the like, for example.

In the first embodiment that has been described so far, the controller 50 (1) sets the switching mechanism 20 such that the rolling bearing 4 does not function as the bearing supporting the rotary shaft 2 but the slide bearing 3 functions as the bearing supporting the rotary shaft 2, and controls the pump 30 to operate the slide bearing 3 as the gas-lubricated bearing when the motor rotation speed is equal to or higher than the first speed V1 and is lower than the second speed V2, (2) stops the pump 30 when the motor rotation speed is equal to or higher than the second speed V2, and (3) further does not stop the pump 30 in the case where the radial acceleration exerted on the rotary shaft 2 is equal to or higher than the predetermined value even when the motor rotation speed is equal to or higher than the second speed V2.

In such a first embodiment, when the motor rotation speed is equal to or higher than the first speed V1 and is lower than the second speed V2, that is, in the middle-speed range R13 where the wedge effect and the restriction effect are exerted to a certain extent, the electricity consumption by the pump 30 that is required to operate the slide bearing 3 as the gas-lubricated bearing is relatively small. Thus, the controller 50 applies the slide bearing 3 as the bearing that functions to support the rotary shaft 2. In this case, the electric efficiency improvement allowance, which is obtained by applying the slide bearing 3 as the gas-lubricated bearing, becomes larger than the electric efficiency reduction allowance, which is obtained by actuating the pump to realize the gas-lubricated bearing. Thus, it is possible to ensure an electric efficiency improvement effect, which is exerted by applying the gas-lubricated bearing.

In the first embodiment, when the motor rotation speed is equal to or higher than the second speed V2, that is, in the high-speed range R14 where the sliding speed is extremely high, the gas-lubricated bearing can be realized even without applying the static pressure by the pump 30. Accordingly, the controller 50 applies the slide bearing 3 as the bearing that functions to support the rotary shaft 2 while stopping the pump 30. In this way, it is possible to maximize the electric efficiency improvement effect, which is exerted by applying the gas-lubricated bearing.

In the first embodiment, in the case where the radial acceleration is equal to or higher than the predetermined value, the pump 30 is not stopped, that is, the actuation of the pump 30 continues even when the motor rotation speed is equal to or higher than the second speed V2. Accordingly, when the radial acceleration is high, it is possible to avoid the contact risk of the slide bearing 3 with the rotary shaft 2 and thus to ensure the safety and the reliability. In addition, the electric efficiency reduction allowance at the time when the actuation of the pump 30 is continued is smaller than the electric efficiency reduction allowance obtained due to the increased friction caused by the contact between the slide bearing 3 and the rotary shaft 2, which possibly occurs when the pump 30 is stopped. Thus, it is possible to suppress the electric efficiency reduction as much as possible.

In the first embodiment, the controller 50 increases the pump driving force as the radial acceleration is increased. Thus, it is possible to effectively avoid the contact risk of the slide bearing 3 with the rotary shaft 2 when the radial acceleration is high.

In the first embodiment, the controller 50 predicts the radial acceleration on the basis of the steering angle, the bump on the road surface, and the condition of the road surface. By using the future radial acceleration that is predicted just as described, it is possible to effectively avoid the contact of the slide bearing 3 with the rotary shaft 2 caused by the increase in the radial acceleration.

In the first embodiment, when the motor rotation speed is equal to or higher than the first speed V1 and is lower than the second speed V2 (in the middle-speed range R13), the controller 50 reduces the pump driving force as the motor rotation speed is increased. In this way, it is possible to cut down the electricity consumption by the pump 30 in the middle-speed range R13 and thus to improve the electric efficiency.

A description will herein be made on a modified example of the above-described embodiment. The modified example is also applied to an embodiment, which will be described below.

In the above-described embodiment, the pump 30 is stopped when the motor rotation speed is lower than the first speed V1. In the modified example, the pump 30 may be actuated to a certain extent. However, when the motor rotation speed is lower than the first speed V1, the controller 50 reduces a driving force of the pump 30 to be smaller than that at the time when the motor rotation speed is equal to or higher than the first speed V1 and is lower than the second speed V2. Similarly, In the above-described embodiment, the pump 30 is stopped when the motor rotation speed is equal to or higher than the second speed V2 and the radial acceleration is lower than the predetermined value (see FIGS. 4 and 8). In the modified example, the pump 30 may be actuated to a certain extent. However, in this case, the controller 50 reduces the driving force of the pump 30 to be smaller than that at the time when the motor rotation speed is equal to or higher than the first speed V1 and is lower than the second speed V2 or that at the time when the motor rotation speed is equal to or higher than the second speed V2 and the radial acceleration is equal to or higher than the predetermined value.

In the above-described embodiment, the motor bearing control is executed on the basis of the motor rotation speed. However, in the modified example, the motor bearing control may be executed on the basis of the motor rotational frequency. This is because the motor rotational frequency uniquely corresponds to the motor rotation speed.

Figure 12:
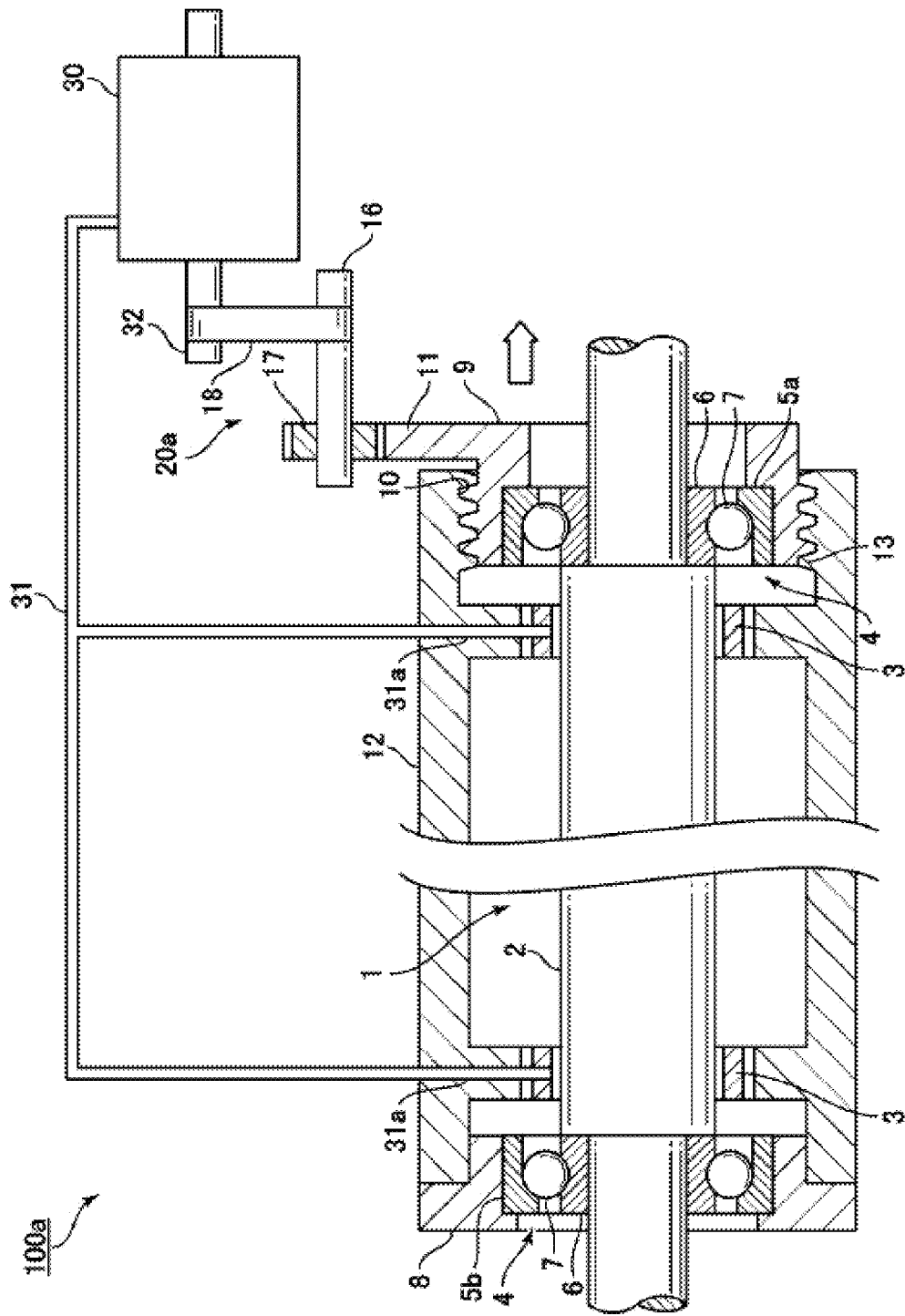
FIG. 12 is a schematic configuration view of a motor bearing system according to a modified example of the first embodiment of the disclosure.

In the above-described embodiment, the controller 50 drives the switching mechanism 20 by controlling the switching drive unit 15, in other words, the controller 50 directly controls the switching mechanism 20 (FIGS. 1 and 2). However, the disclosure is not limited to such an embodiment. FIG. 12 is a schematic configuration view of a motor bearing system according to the modified example of the first embodiment. In a motor bearing system 100$a$ according to this modified example, the switching mechanism 20$a$ is driven not by the switching drive unit 15 as in the above-described embodiment but by the pump 30. More specifically, in the switching mechanism 20$a$, the drive shaft 16 of the drive gear 17 that meshes with the fan-shaped gear 11 of the outer ring movable member 9 is not driven by the switching drive unit 15 as in the above-described embodiment but by the pump 30. Further in detail, the drive shaft 16 of the switching mechanism 20$a$ and a rotary shaft 32 of the pump 30 are connected via a predetermined transmission member 18 such as a belt, a chain, or a gear. In this way, rotation of the rotary shaft 32 of the pump 30 is transmitted to the drive shaft 16 of the switching mechanism 20$a$. Thus, when the pump 30 is actuated, the switching mechanism 20$a$ is driven. In such a modified example, the controller 50 indirectly controls the switching mechanism 20$a$ via the pump 30 instead of directly controlling the switching mechanism 20$a$.

Second Embodiment

Next, a description will be made on a second embodiment of the disclosure. The second embodiment differs from the first embodiment in a point that the pump driving force is controlled on the basis of the vehicle speed. More specifically, in the second embodiment, in the case where the radial acceleration exerted on the rotary shaft 2 is equal to or higher than the predetermined value while the pump 30 is actuated to operate the slide bearing 3 as the gas-lubricated bearing, the controller 50 increases the pump driving force to be larger than that at the time when the radial acceleration is lower than the predetermined value, and changes such a predetermined value according to the vehicle speed.

A specific description will herein be made on motor bearing control according to the second embodiment with reference to FIG. 13. FIGS. 13A and 13B are graphs for the motor bearing control according to the second embodiment. More specifically, FIG. 13A is the graph of the motor bearing control at the low vehicle speed, and FIG. 13B is the graph of the motor bearing control at the high vehicle speed. In addition, in each of FIGS. 13A and 13B, a horizontal axis represents the time, and a vertical axis represents the radial acceleration exerted on the rotary shaft 2.

In the second embodiment, as described above, in the case where the radial acceleration is equal to or higher than the predetermined value, the controller 50 increases the pump driving force to be larger than that at the time when the radial acceleration is lower than the predetermined value, and changes this predetermined value according to the vehicle speed. More specifically, as illustrated in FIGS. 13A and 13B, the controller 50 reduces a predetermines value A12 used at the high vehicle speed to be lower than a predetermined value A11 used at the low vehicle speed. In other words, the controller 50 reduces the predetermined value, which is used to increase the pump driving force according to the radial acceleration, as the vehicle speed is increased. In this way, a radial acceleration range where the control for increasing the pump driving force is executed is larger at the high vehicle speed than at the low vehicle speed (a range R22>a range R21). This is because, even at the same radial acceleration, it is more difficult to secure the gas layer between the slide bearing 3 and the rotary shaft 2 at the high vehicle speed than at the low vehicle speed, and thus the possibility that the slide bearing 3 contacts the rotary shaft 2 is increased.

According to such a second embodiment, the predetermined value, which is used to increase the pump driving force according to the radial acceleration, is changed according to the vehicle speed. Thus, it is possible to effectively avoid the contact risk of the slide bearing 3 with the rotary shaft 2 when the radial acceleration is high.

Third Embodiment

Next, a description will be made on a third embodiment of the disclosure. In the first embodiment, the bearing that functions to support the rotary shaft 2 of the motor 1 is switched between the rolling bearing 4 and the slide bearing 3 that is operable as the gas-lubricated bearing by the gas supplied from the pump 30. In contrast, the third embodiment differs from the first embodiment in a point that, instead of using the two bearings of the rolling bearing 4 and the slide bearing 3, only one rolling bearing is used to supply the gas from the pump 30 to this rolling bearing, and the rolling bearing is thereby operated as the gas-lubricated bearing that achieves the gaseous lubrication. Thus, in the third embodiment, the switching mechanisms 20, 20a as described in the first embodiment are not provided.

Here, a description on the same configurations and control as those in the first and second embodiments will not be made, and a description will only be made on a different configuration and different control from those in the first and second embodiments. In particular, in the third embodiment, only the configuration of the motor bearing system differs from that in each of the first and second embodiments, and the motor bearing control is the same as that in the first and second embodiments.

Figure 14:
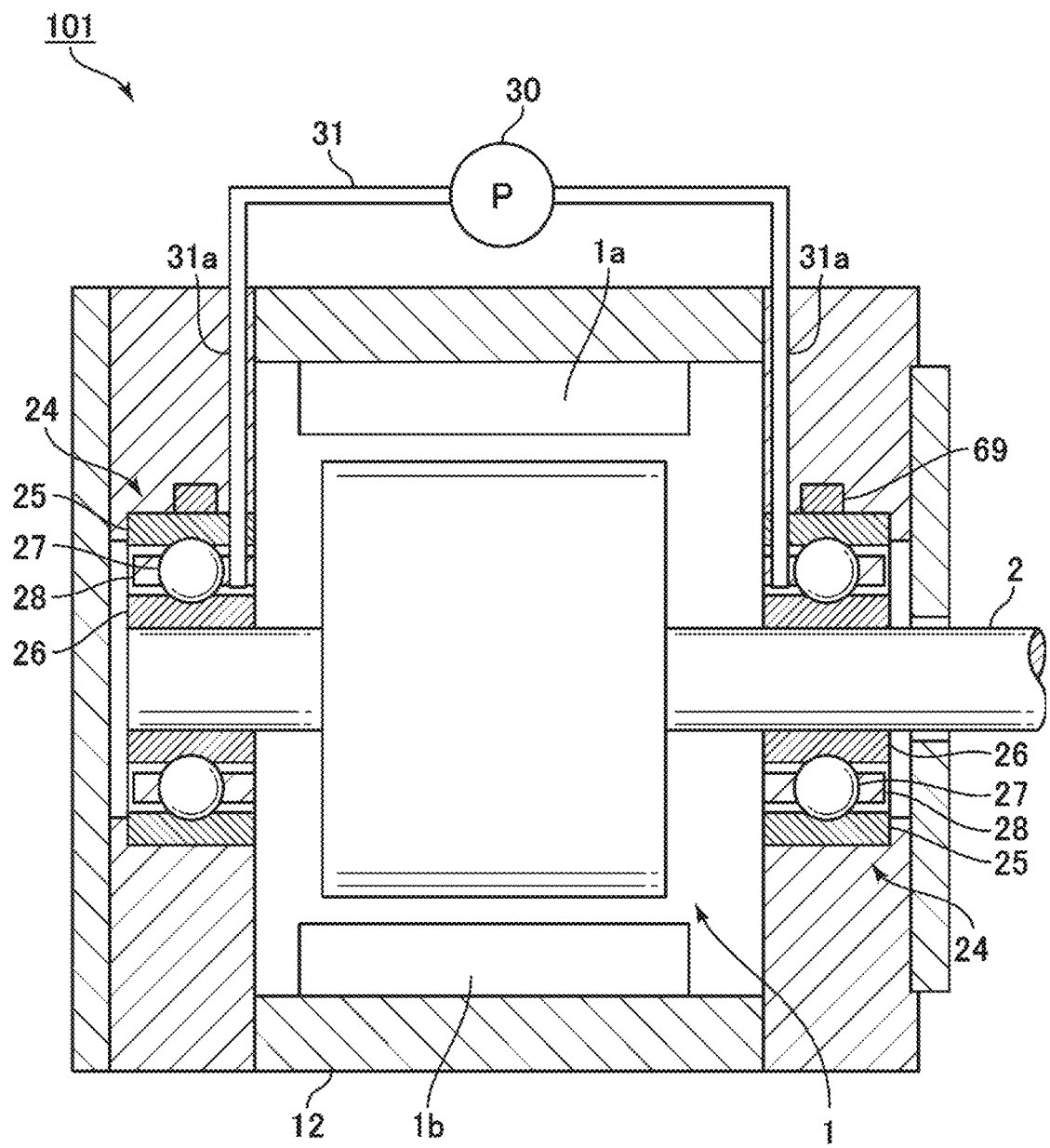
FIG. 14 is a schematic configuration view of a motor bearing system according to a third embodiment of the disclosure.

FIG. 14 is a schematic configuration view of a motor bearing system according to the third embodiment. As illustrated in FIG. 14, a motor bearing system 101 according to the third embodiment has: the motor 1 that includes a rotor 1a and a stator 1b; the rotary shaft 2 of the motor 1; a pair of rolling bearings 24 that supports the rotary shaft 2; and the housing 12 that accommodates these motor 1, rotary shaft 2, and rolling bearings 24. Each of the rolling bearings 24 has: an outer ring 25 that is fixed to the housing 12; an inner ring 26 that is attached to the rotary shaft 2 of the motor; plural rolling elements (balls and rollers) 27 that are interposed between these outer ring 25 and inner ring 26; and a holding section 28 that holds the plural rolling elements 27. On an outer side of the outer ring 25 in the rolling bearing 24, the bearing load sensor 69 is provided to detect the load (the radial load) that is radially applied to the rolling bearing 24.

The motor bearing system 101 further has the pump 30 that supplies the gas (typically the air but may be the oil gas or the refrigerant) to the rolling bearing 24 in order to form the gas layer between the rotary shaft 2 and the rolling bearing 24 and thereby achieve the gaseous lubrication of the rolling bearing 24, that is, to cause the rolling bearing 24 to operate as the gas-lubricated bearing. More specifically, the pump 30 supplies the gas through the gas supply passage 31 to a portion (the radial clearance that is defined in the radial direction of the rotary shaft 2) between the inner ring 26 in each of the paired rolling bearings 24 and the holding section 28 holding the rolling element 27. In this gas supply passage 31, the downstream portion 31a thereof is formed in the housing 12, the outer ring 25 of the rolling bearing 24, and the holding section 28.

FIG. 15 illustrates a state of the rolling bearing 24 at the time when the pump 30 is not actuated in the motor bearing system 101. FIG. 15 illustrates a transverse cross section of the rotary shaft 2 and the rolling bearing 24 on a left side, and illustrates a vertical cross section of the rotary shaft 2 and the rolling bearing 24 that is orthogonal to this transverse cross section on a right side. As illustrated in FIG. 15, when the pump 30 is not actuated, the rolling element 27 of the rolling bearing 24 is in contact with the outer ring 25 and the inner ring 26, and the rolling bearing 24 literally functions as the rolling bearing.

FIG. 16 illustrates the state of the rolling bearing 24 at the time when the pump 30 is actuated in the motor bearing system 101. FIG. 16 illustrates a transverse cross section of the rotary shaft 2 and the rolling bearing 24 on a left side, and illustrates a vertical cross section of the rotary shaft 2 and the rolling bearing 24 that is orthogonal to this transverse cross section on a right side. When the pump 30 is actuated, in the rolling bearing 24, the gas layer is formed in a clearance SP between the inner ring 26 and the holding section 28, which holds the rolling element 27, by the gas supplied from the pump 30, and the holding section 28 and the rolling element 27 float from the inner ring 26. At this time, the holding section 28 is fixed to the outer ring 25 by a locking member (a claw or the like) so as not to rotate. In such a state, since the rolling element 27 that is held by the holding section 28 does not contact the inner ring 26, the rolling bearing 24 no longer functions as the rolling bearing. Instead, the rolling bearing 24 functions as the gas-lubricated bearing that achieves the gaseous lubrication by the gas supplied from the pump 30. As described in the first embodiment, in the high-speed range R14 where the sliding speed is extremely high, such a gas-lubricated bearing is realized (thus the pump 30 is stopped) even when the static pressure is not applied by the pump 30.

According to the third embodiment that has been described so far, the single rolling bearing 24 is selectively operated as the rolling bearing or the gas-lubricated bearing. Thus, the similar motor bearing control to that in the first and second embodiments can be executed with the simple configuration.

REFERENCE SIGNS LIST

1: motor
2: rotary shaft
3: slide bearing
4: rolling bearing
5a, 5b: outer ring
6: inner ring
7: rolling element
12: housing
15: switching drive unit
20: switching mechanism
24: rolling bearing
25: outer ring
26: inner ring
27: rolling element
28: holding section
30: pump
31: gas supply passage
50: controller
66: motor rotation speed sensor
100, 100a, 101: motor bearing system

The invention claimed is:

1. A motor bearing system comprising:
a rolling bearing that supports a rotary shaft of a motor;
a slide bearing that is arranged in parallel with the rolling bearing on an axis of the rotary shaft to support the rotary shaft, the slide bearing being operable as a gas-lubricated bearing that achieves gaseous lubrication with gas supplied to the slide bearing;
a pump that supplies the gas to the slide bearing;
a detector configured to detect a rotation speed of the motor; and
a controller that is configured to control the pump on a basis of the rotation speed detected by the detector, wherein
the controller is configured to
control the pump such that, when the rotation speed is equal to or higher than a first speed and is lower than a second speed that is higher than the first speed, the rolling bearing does not function as a bearing that supports the rotary shaft, but the slide bearing functions as the bearing that supports the rotary shaft, and the slide bearing functions as the gas-lubricated bearing, and
control the pump to stop the pump or reduce a driving force of the pump to be smaller than that at a time when the rotation speed is equal to or higher than the first speed and lower than the second speed in a case where the rotation speed is equal to or higher than the second speed, and the controller is further configured to control the pump such that, in the case where the rotation speed is equal to or higher than the second speed and a radial load exerted on the rotary shaft is equal to or larger than a predetermined value, the pump is not stopped, and the driving force of the pump is increased to be larger than that at a time when the radial load is smaller than the predetermined value.

2. The motor bearing system according to claim 1, wherein the controller is configured to increase the driving force of the pump as the radial load is increased.

3. The motor bearing system according to claim 1, wherein the controller is configured to predict the radial load on a basis of a steering angle of a vehicle mounted with the motor bearing system.

4. The motor bearing system according to claim 1, wherein the controller is configured to predict the radial load on a basis of a bump on a road surface on which a vehicle mounted with the motor bearing system travels.

5. The motor bearing system according to claim 1, wherein the controller is configured to predict the radial load on a basis of a condition of a road surface on which a vehicle mounted with the motor bearing system travels.

6. The motor bearing system according to claim 1, wherein, when the rotation speed is equal to or higher than the first speed and is lower than the second speed, the controller reduces the driving force of the pump as the rotation speed is increased.

7. The motor bearing system according to claim 6, wherein the controller is further configured to control the driving force of the pump on a basis of a vehicle speed of a vehicle mounted with the motor bearing system.

8. The motor bearing system according to claim 1, wherein the controller is further configured to control the driving force of the pump on a basis of a vehicle speed of a vehicle mounted with the motor bearing system.

9. A motor bearing system comprising:
- a bearing that includes plural rolling elements and supports a rotary shaft of a motor, the bearing being operated as a rolling bearing or being operated as a gas-lubricated bearing that achieves gaseous lubrication with gas supplied to the bearing;
- a pump that supplies the gas to the bearing;
- a detector configured to detect a rotation speed of the motor; and
- a controller that is configured to control the pump on a basis of the rotation speed detected by the detector, wherein the controller is configured to control the pump such that, when the rotation speed is equal to or higher than a first speed and is lower than a second speed that is higher than the first speed, the bearing is operated as the gas-lubricated bearing, and control the pump such that, in the case where the rotation speed is equal to or higher than the second speed, the pump is stopped or a driving force of the pump is reduced to be smaller than that at a time when the rotation speed is equal to or higher than the first speed and lower than the second speed, and the controller is further configured to control the pump such that, in the case where the rotation speed is equal to or higher than the second speed and a radial load exerted on the rotary shaft is equal to or larger than a predetermined value, the pump is not stopped, and the driving force of the pump is increased to be larger than that at a time when the radial load is smaller than the predetermined value.

10. The motor bearing system according to claim 9, wherein the controller is configured to increase the driving force of the pump as the radial load is increased.

11. The motor bearing system according to claim 9, wherein the controller is configured to predict the radial load on a basis of a steering angle of a vehicle mounted with the motor bearing system.

12. The motor bearing system according to claim 9, wherein the controller is configured to predict the radial load on a basis of a bump on a road surface on which a vehicle mounted with the motor bearing system travels.

13. The motor bearing system according to claim 9, wherein the controller is configured to predict the radial load on a basis of a condition of a road surface on which a vehicle mounted with the motor bearing system travels.

14. The motor bearing system according to claim 9, wherein, when the rotation speed is equal to or higher than the first speed and is lower than the second speed, the controller reduces the driving force of the pump as the rotation speed is increased.

15. The motor bearing system according to claim 14, wherein the controller is further configured to control the driving force of the pump on a basis of a vehicle speed of a vehicle mounted with the motor bearing system.

16. The motor bearing system according to claim 9, wherein the controller is further configured to control the driving force of the pump on a basis of a vehicle speed of a vehicle mounted with the motor bearing system.

\* \* \* \* \*